United States Patent
Yoshida et al.

(10) Patent No.: US 7,840,413 B2
(45) Date of Patent: Nov. 23, 2010

(54) METHOD AND SYSTEM FOR INTEGRATING IDEA AND ON-DEMAND SERVICES

(75) Inventors: Norimasa Yoshida, Daly City, CA (US); Justin Lin, Redwood City, CA (US); Likuo Lin, Redwood City, CA (US)

(73) Assignee: Salesforce.Com, Inc., San Francisco, CA (US)

(*) Notice: Subject to any disclaimer, the term of this patent is extended or adjusted under 35 U.S.C. 154(b) by 763 days.

(21) Appl. No.: 11/801,572

(22) Filed: May 9, 2007

(65) Prior Publication Data
US 2008/0281610 A1 Nov. 13, 2008

(51) Int. Cl.
*G06F 17/00* (2006.01)
(52) U.S. Cl. .......................................... 705/1
(58) Field of Classification Search ........................ 705/1
See application file for complete search history.

(56) References Cited

U.S. PATENT DOCUMENTS

| | | | |
|---|---|---|---|
| 5,790,677 A * | 8/1998 | Fox et al. ................... | 705/78 |
| 6,434,550 B1 | 8/2002 | Warner et al. | |
| 6,665,655 B1 | 12/2003 | Warner et al. | |
| 6,842,748 B1 | 1/2005 | Warner et al. | |
| 7,373,606 B2 | 5/2008 | Gorzela | |
| 7,529,795 B2 | 5/2009 | Arav | |
| 2001/0053997 A1 | 12/2001 | Bain | |
| 2003/0187706 A1 | 10/2003 | Buchmiller et al. | |
| 2004/0162751 A1 | 8/2004 | Tsyganskiy et al. | |
| 2004/0181417 A1 | 9/2004 | Piller et al. | |
| 2006/0277305 A1* | 12/2006 | Bernardin et al. ........... | 709/226 |
| 2007/0179856 A1 | 8/2007 | O'Kelley | |
| 2007/0226628 A1 | 9/2007 | Schlack | |
| 2008/0222191 A1 | 9/2008 | Yoshida et al. | |
| 2008/0254436 A1 | 10/2008 | Morgia et al. | |
| 2008/0256002 A1 | 10/2008 | Yoshida et al. | |
| 2008/0288914 A1 | 11/2008 | Schmitter | |

(Continued)

FOREIGN PATENT DOCUMENTS

WO WO 2005/013079 A2 2/2005

(Continued)

OTHER PUBLICATIONS

Digg; Mar. 5, 2007; wayback machine website archive.*

(Continued)

*Primary Examiner*—Thomas Dixon
(74) *Attorney, Agent, or Firm*—David Lewis; Jennifer A. Haynes

(57) ABSTRACT

A method and system is provided having a webpage for posting ideas integrated with on-demand customer relationship management. The website associated with the page may be stored in a tenant area of a multitenant database to facilitate maintaining multiple websites for different tenants. A webpage may be sent to a client that includes a plurality of sections, each including at least one idea related to an improvement of a product. Votes may be received for at least one of the plurality of sections. A determination may be made of a Total Qualitative Management Criterion (TQMC) for each section of the website, by applying an increasing function of time to newer votes to enable relative weightings of older votes to diminish over time without requiring computing a decaying time function to determine weightings for each vote. A product modification may be determined based on the TQMC for each section.

58 Claims, 16 Drawing Sheets

U.S. PATENT DOCUMENTS

2008/0313040 A1    12/2008    Rose et al.
2009/0119329 A1    5/2009    Kwon et al.
2009/0204507 A1    8/2009    Cockayne et al.

OTHER PUBLICATIONS

Digg tools; Dec. 8, 2006; wayback machine website archive.*

Digg frequently asked questions; Feb. 8, 2007; wayback machine website archive.*

U.S. Appl. No. 11/716,365 entitled Method and System for Posting Ideas, by Norimasa Yoshida, et al., filed Mar. 8, 2007.

U.S. Appl. No. 11/786,882 entitled Method and System for Posting Ideas to a Reconfigurable Website, by Norimasa Yoshida, et al., filed Apr. 13, 2007.

Title: The Motley Fool URL: http://web.archive.org/web/20060821122124/http://www.fool.com/, and http://www.fool.com Date: Aug. 21, 2006.

Title: "Amazon.com: Harry Potter and the Deathly Hallows (Book 7): Books: J.K. Rowling" URL: "http://web.archive.org/web/20070204090617/www.amazon.com/Harry-Potter-Deathly-Hallows-Book/dp/0545010225", URL date: Mar. 7, 2007, Home Page: "http://www.amazon.com".

Title: "Digg / News" URL: "http://web.archive.org/web/20070305222708/http://www.digg.com", URL date: Mar. 5, 2007, Home Page: "http://www.digg.com".

Title: "Digg—Unique Super Mario Bros. 2 Prototype Cartridge Discovered and Documented" URL: "http://web.archive.org/web/20070307081653/digg.com/gaming_news/Unique_Super_Mario_Bros_2_Prototype_Cartridge_Discovered_and_Documented", URL Date: Mar. 5, 2007, Home Page: "http://www.digg.com".

Digg; Feb. 8, 2007; waybackmachine archive website. Title: "Digg" URL: "http://web.archive.org/", URL Date: Feb. 8, 2007, Home Page: "http://www.digg.com".

Digg • Frequently Asked Questions; Feb. 8, 2007; wayback machine archive website. Title: "Digg" URL: "http://web.archive.org/", URL Date: Feb. 8, 2007, Home Page: "http://www.digg.com".

Digg—Gaming; Dec. 30, 2006; wayback machine archive. Title: "Digg" URL: "http://web.archive.org/", URL Date: Dec. 30, 2007, Home Page: "http://www.digg.com".

Digg—Tools; Dec. 8, 2006; wayback machine archive website. Title: "Digg" URL:"http://web.archive.org/", URL Date: Dec. 8, 2007, Home Page: "http://www.digg.com".

* cited by examiner

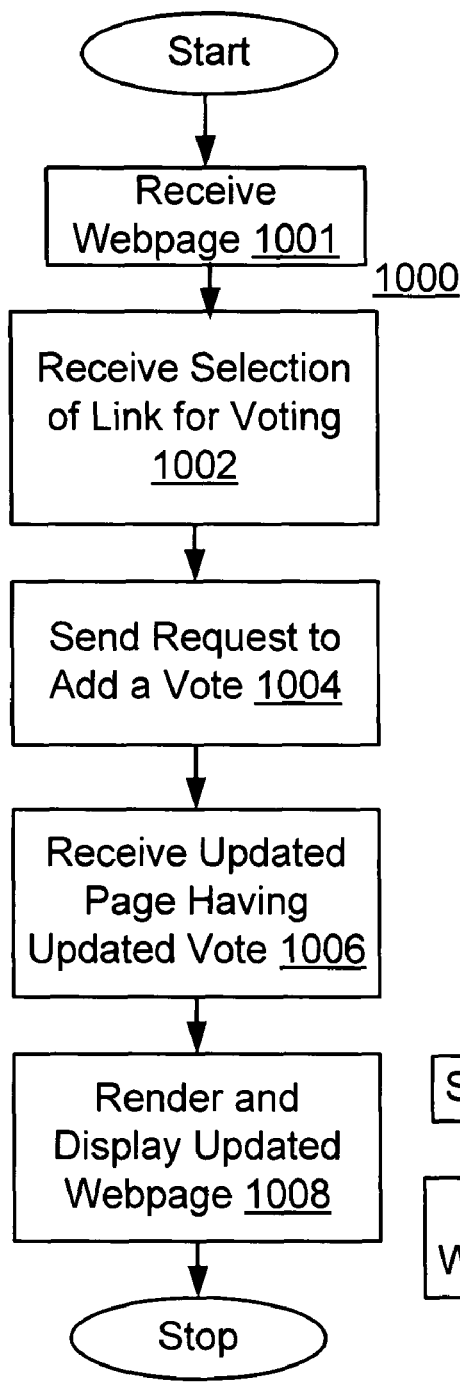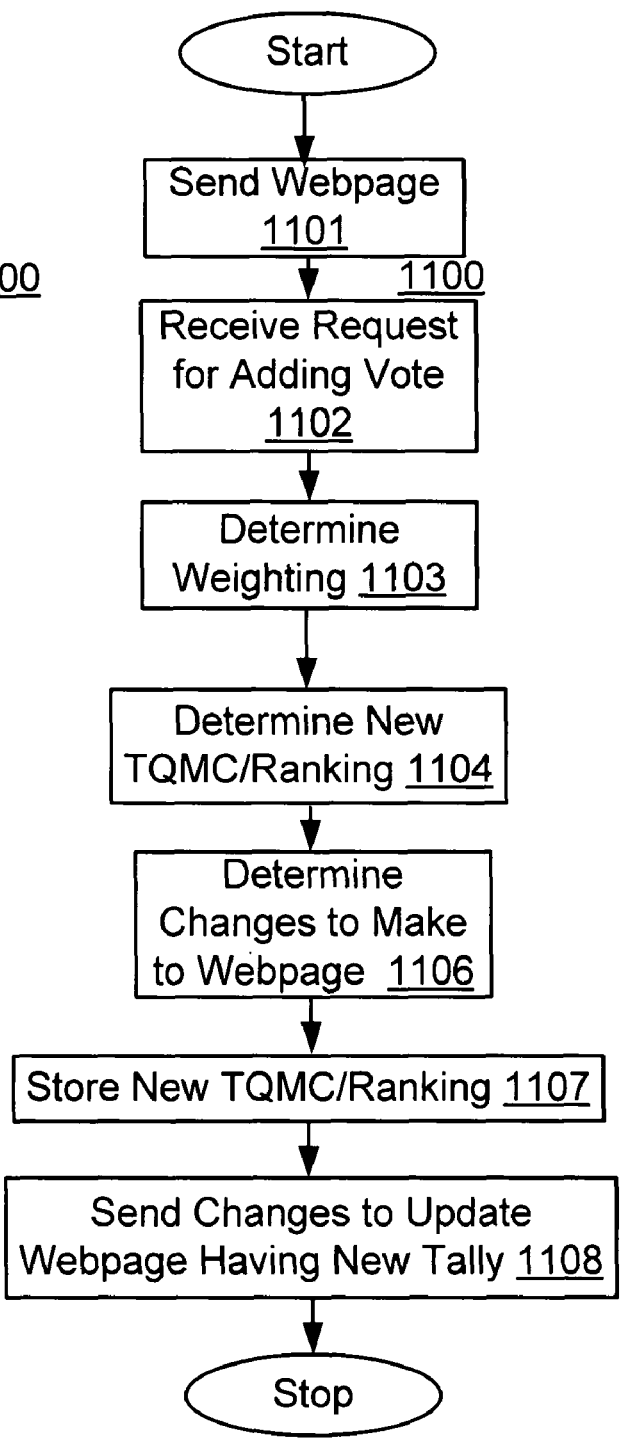
FIG. 10
FIG. 11

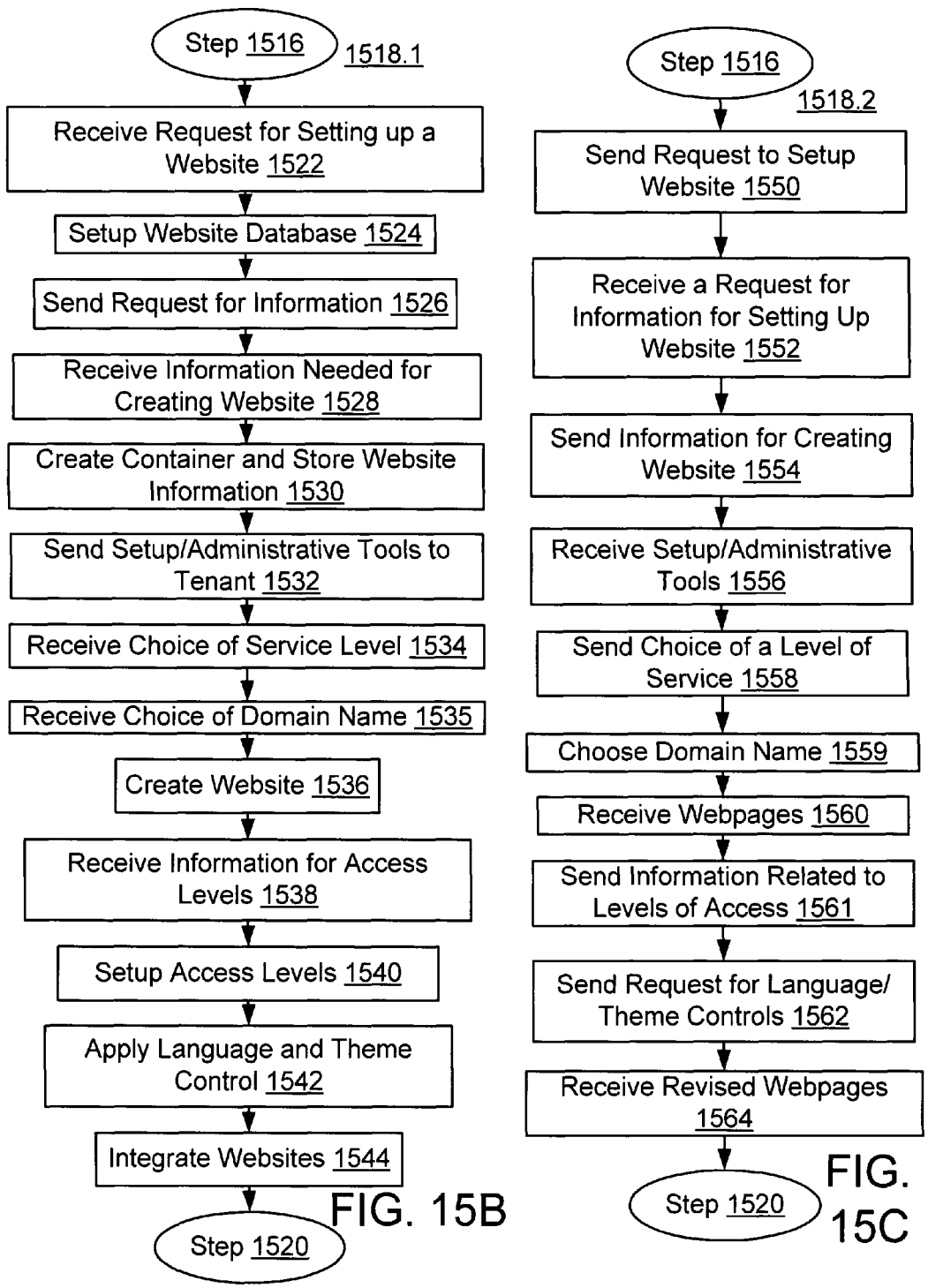

METHOD AND SYSTEM FOR INTEGRATING IDEA AND ON-DEMAND SERVICES

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/716,365 entitled METHOD AND SYSTEM FOR POSTING IDEAS, by Norimasa Yoshida, et al., filed Mar. 8, 2007, U.S. patent application Ser. No. 11/786,882 entitled METHOD AND SYSTEM FOR POSTING IDEAS TO A RECONFIGURABLE WEBSITE, filed Apr. 13, 2007, by Norimasa Yoshida, et al., and U.S. patent application Ser. No. 11/801,572 entitled METHOD AND SYSTEM FOR INTEGRATING IDEA AND ON-DEMAND SERVICES, by Norimasa Yoshida, et al., filed May 9, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing ideas in an online environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some forms of obtaining customer feedback are focus groups and user meetings. However, focus groups and user meetings can be expensive to run. Additionally, it can be difficult to determine whether the consensus of a focus group is representative of the actual customer base, because different focus groups may at least sometimes indicate different conclusions. Conventionally, applications, such as databases, file systems, word processors and the like, were delivered to the end users in the form of software. Feedback mechanisms for these products exist typically in the form of problem reports, quality surveys and the like.

With the advent of the web, however, software-like utility is increasingly delivered to users as a service. These so named "software as a service" approaches may include a group of end users, who may wish to use the service offering collaboratively, or who may wish to share their input as a community, making the old problem report or feedback survey cumbersome or unsatisfactory.

Accordingly, it is desirable to provide techniques enabling sharing ideas to improve service offerings.

BRIEF SUMMARY

In an embodiment, services for sharing ideas and for providing an on-demand service are integrated. In an embodiment, an idea website for sharing ideas is provided to share ideas within a community of users. In an embodiment, the idea website associated with a particular tenant is stored in the tenant area of the multi-tenant database to facilitate maintaining separate idea websites for each of multiple tenants. In an embodiment, the idea website may be used in conjunction with providing on-demand customer relationship management (CRM) service. In an embodiment and by way of example, an idea website can augment customer relationship management services by enabling the tenant to solicit ideas from the tenant's customers. These ideas may facilitate the tenant partnering with the customer to improve the tenant's products for example, thereby promoting customer satisfaction and retention. Many other uses and configurations are enabled and will be discussed with reference to example embodiments below. In this specification the word "product" is generic to the word "services," and these words may be used interchangeably in this document to refer to various embodiments. Additionally, customer relationship management may be augmented by providing analytical tools for analyzing user input, and based on the user input the tenant can determine which services and/or products to cut back, remove, enhance, and/or develop.

In an embodiment, an idea website may be associated with a particular organization that has its own (other) website and integrated with data of that organization so that the organization's data may appear on, or be used by, the idea website. For example, a website providing service provides a website to a sponsoring organization for the sponsoring organization to maintain. The website may be an idea website that may be managed by the sponsoring organization but provided by a website providing organization. The sponsoring organization determines the target community that will be associated with the idea website. In one embodiment the idea website may be managed by the sponsoring organization, but maintained by the website providing organization. In other words, the sponsoring organization may determine that a change needs to be made to the idea website and may be given tools for causing the change to happen, but the tools send a request to the web server of the website providing organization, which causes the changes requested to occur.

In embodiments, the idea website may be for customer feedback and/or for establishing a dialogue amongst members of a community associated with the sponsoring organization. Communities may include without limitation, users, customers, retirees, employees and so forth. Accordingly the words "community website," "customer feedback website," "customer sites," and "idea website" may be interchanged in the specification to obtain different embodiments. For example, in an embodiment, the members of the community may include the sponsoring organization and the customers of the sponsoring organization, such that the customers can communicate with each other in addition to different members of the sponsoring organization.

In addition to the customer feedback website, each sponsoring organization may have their own customers and their own website, and the website of the sponsoring organization may be associated with a product or service provided by the sponsoring organization. In this specification, the term "product" is generic to the term "service." The customer feedback website may be provided with a variety of tools for setting up and configuring the customer feed back website, for managing the customer feedback website, for analyzing the data provided by the customer feedback website, and/or for integrating the customer feedback website with another website, such as the website associated with the sponsoring organization.

An idea may be posted on the idea website as an article describing the idea. An idea may also be other types of content. Accordingly, the words "idea," "content," and "article" are used interchangeably herein. Votes may indicate the degree of merit to an idea based on various Qualitative Management Criteria (QMC), such as without limitation importance, correctness, user preference for the articles and the like. The votes may be tallied into an overall Total Qualitative Management Criterion (TQMC). Various factors that may determine the weight of a vote are the time of the vote, style of voting, or site management selected weightings retrieved from the on-demand service based on some identifying criteria about the user casting the vote prior to being tallied. The factors that determine the weight of a vote may be based on information about the votes and/or voters, which may be stored on system 16, and/or the factors may be taken from other sources other than system 16, which may or may not be related to the votes or voters. For example, votes by current users may be weighted with more weights than given to votes of prospective users or casual observers making commentary or the like. In another example, votes cast by customers subscribing to a premium (i.e., gold-level or elite) service may be weighted more than votes of customers subscribing to a basic level service. In an embodiment, weightings may be applied that cause older votes to have less importance than more recent votes. Some embodiments may apply an increasing function of time to newer votes to enable the relative weightings of older votes to diminish over time without having to compute a decaying time function to determine weightings for each vote. The articles may be displayed to other users in the idea website in ranked order in which the ranking is based on a value associated with the Total Qualitative Management Criterion.

In accordance with embodiments, there are provided mechanisms and methods for posting ideas. These mechanisms and methods for posting ideas can enable embodiments to provide the sharing of ideas between the host and client about ways to improve the product and/or service that a service provider, not necessarily the owner of the host, provides to the client. The ability of embodiments to provide the sharing of ideas can enable the providing of a better product and/or of better customer satisfaction. In an embodiment and by way of example, a method for sharing ideas is provided. The method embodiment includes providing a website for the posting of ideas, a mechanism via which the customers can express their opinion, such as by voting, and a mechanism for ranking the ideas according to the votes.

In one embodiment, advertising based revenues may be earned from advertisers posting advertisements on the sites. In another embodiment, the sponsoring organizations may pay a fee for having a website upon which customers and the sponsoring organizations can post ideas. In yet another embodiment, the sponsoring organization is offered a choice of whether to pay a fee for the website and keep the site free of advertisers or whether to allow the advertisers to advertise on the website. In another embodiment, advertising revenues may be shared between the sponsoring organizations and the company providing the website.

While the present invention is described with reference to an embodiment in which techniques for posting ideas are implemented in a system having an application server providing a front end for an on-demand community capable of supporting websites of a potentially large plurality of sponsoring organizations (or "tenants"), the present invention is not limited to multi-tenant implementations nor deployment on application servers. Embodiments may be practiced using other components and/or architectures, than the examples provided here without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 8A shows a block diagram of an example of the web application of FIG. 7; FIG. 8B shows a block diagram of an embodiment of setup routine for setting up and configuring one of websites of FIG. 4; FIG. 8C is a block diagram of an example of administrative tools.

FIG. 10 shows a flowchart of an example of a method implemented by the client as part of a voting algorithm;

FIG. 11 shows a flowchart of an example of a method implemented by the web server of FIG. 7 as part a voting algorithm;

FIG. 15B is a flowchart of an example of a server-side method for implementing one of the steps of FIG. 15A;

FIG. 15C is a flowchart of an example of a client-side method for implementing one of the steps of FIG. 15A.

DETAILED DESCRIPTION

Figure 1A:
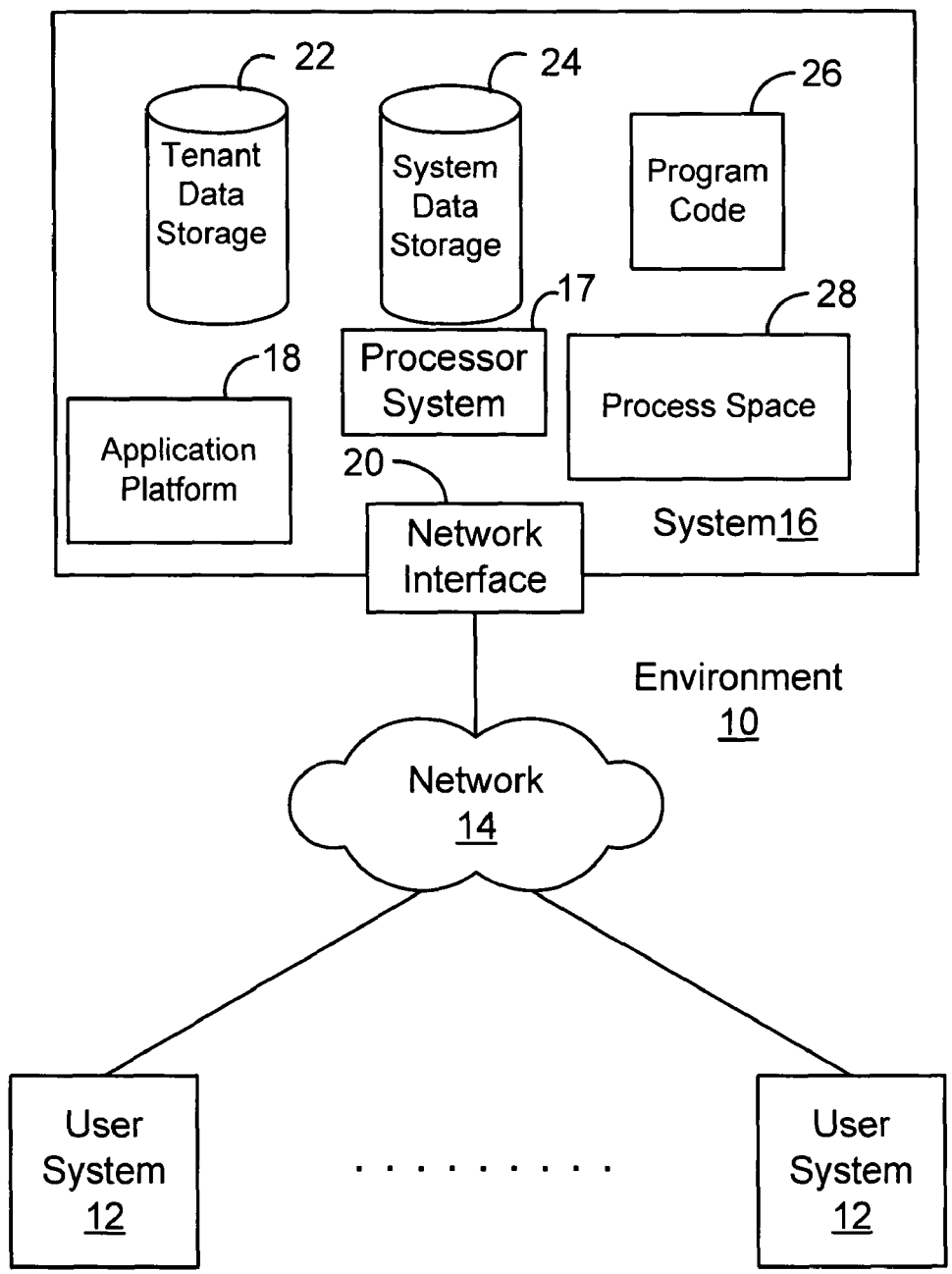
FIG. 1A illustrates a block diagram of an example of an environment wherein an idea posting website might be used in conjunction with an on-demand database service embodiment.

Systems and methods are provided for posting ideas in conjunction with other on-demand services. Ideas may be posted to the website for viewing, commenting and discussion and/or voting upon by members of a community. As used herein, the words idea and article may be used interchangeably to refer to an item posted to the idea website for one or more of viewing, commenting and voting upon. In an embodiment the idea website may be stored in a tenant area of a multitenant database to facilitate maintaining multiple websites for different tenants. While the techniques presented here are discussed with reference to example embodiments used in conjunction with an on-demand customer relations management (CRM) service, embodiments are not limited to CRM and may include any of a wide variety of on-demand implemented services.

Embodiments include the idea website as a standalone website, use of the idea website in conjunction with an on-line service to support a community of users, and a service offering (or product) that hosts idea websites on behalf of tenants (customers) who would like to provide website communities for their own users.

Site information for multiple tenants may be maintained in a common multi-tenant system. Votes may indicate criteria, merits, qualities, and/or attributes of an article by indicating the community's opinion as to the presence of or the degree of presence of criteria, merits, qualities, and/or attributes of an article. For example, votes may indicate importance, correctness, user preference for the articles or other such Qualitative Management Criteria (QMC). The votes can be tallied into an overall Total Qualitative Management Criterion (TQMC). Votes can be weighted by time since the time of the vote, style of voting, or site management selected weightings retrieved from the on-demand service based on some identifying criteria about the user casting the vote prior to the votes being tallied. The ideas may be displayed to other users in the community in ranked order by the Total Qualitative Management Criterion. Although in many places in the specification methods of computing the TQMC using time dependent weightings are discussed, except where otherwise indicated by the context the same methods related to the time dependent weightings may be applied for computing QMCs (as well as TQMCs that are formed by the QMCs) and other rankings. Consequently, in the discussions of weightings for TQMCs, other embodiments may be obtained by substituting QMCs, the QMCs and the resulting TQMCs, or other rankings for TQMCs specified.

While embodiments are useful in a variety of configurations and applications, an example application in which a website is provided in conjunction with an on-demand multi-tenant database service will be used to illustrate, but not limit, the many features and benefits provided by embodiments of the invention. An on-demand multi-tenant database service is not required, however. As used herein, the term multi-tenant database system refers to those systems in which various elements of hardware and/or software of the database system may be shared by one or more tenants (whom may be customers of the on-demand multi-tenant database). For example, a given application server may simultaneously process requests for a great number of tenants, and a given database table may store rows for a potentially much greater number of tenants. In an embodiment, a service may be provided for tenants to sponsor their own customer sites (which are idea websites). Customer sites may allow users to post proposed modifications, new product ideas, suggestions and/or problems about a customer's product or service. Other users in the community can view these postings and vote on them. Votes may indicate things such as importance, correctness, user preference or other such Qualitative Management Criteria (QMC). The votes can be tallied into an overall Total Qualitative Management Criterion (TQMC). The postings may be displayed to other users in the community in ranked order by the Total Qualitative Management Criterion. The system would provide input to a customer's decision regarding content posted on the customer's site. A problem may be encountered in maintaining customer sites for each customer of the service. However, this problem may be solved by storing customer site data in the tenant area of a multitenant database service.

Next, mechanisms and methods for providing the posting of ideas will be described with reference to example embodiments.

System Overview

FIG. 1A illustrates a block diagram of an environment 10 wherein an idea posting website might be used in conjunction with an on-demand database service embodiment. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. In an example application of one embodiment, an idea website is provided to enable users of customers of the on-demand database service to share ideas about the service. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 2), user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables the creating, managing, and executing of one or more applications that were developed by the provider of the on-demand database service, the users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1A, implements a web-based customer relationship management (CRM) system. For example, in one embodiment, system 16 includes application servers configured to implement and execute CRM software applications as well as provide related data, code, forms, webpages, and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages the creation of and/or the storage of the applications into one or more database objects and which manages the execution of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in, which can be used to program a computer to perform any of the processes of the embodiments described herein. Computer code for operating and configuring system 16 to intercommunicate and to process webpages, applications, and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, the MTSs may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
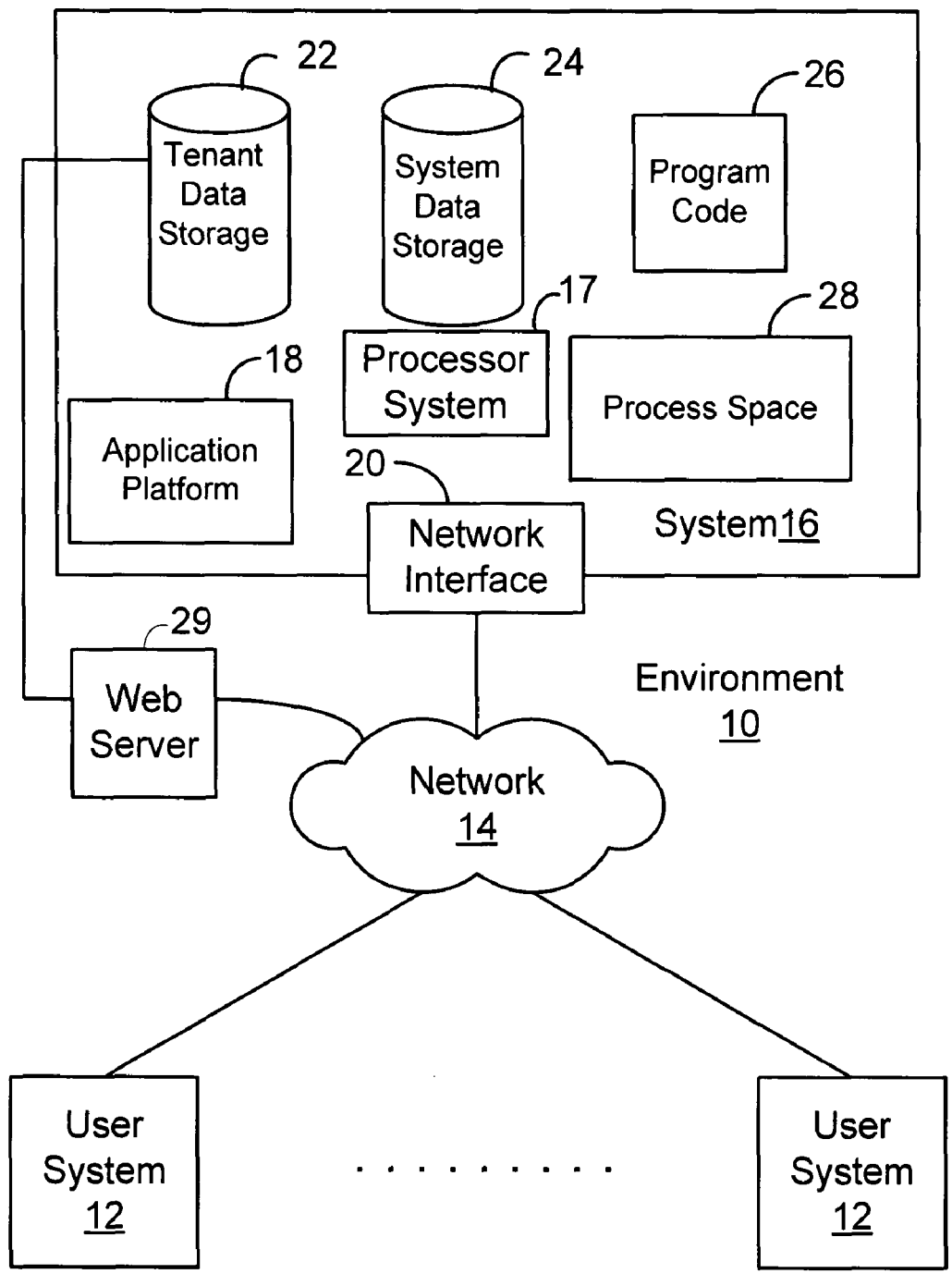
FIG. 1B illustrates a block diagram of an example of an alternative embodiment of environment wherein an idea posting website might be used in conjunction with an on-demand database service.

FIG. 1B illustrates a block diagram of an environment 10 wherein an idea posting website might be used in conjunction with an on-demand database service embodiment. Environment 10 may include user systems 12, network 14, system 16, processor system 17, application platform 18, network interface 20, tenant data storage 22, system data storage 24, program code 26, process space 28, and web server 29. In other embodiments, environment 10 may not have all of the components listed and/or may have other elements instead of, or in addition to, those listed above.

Environment 10, user systems 12, network 14, system 16, processor system 17, application platform 18, network interface 20, tenant data storage 22, system data storage 24, program code 26, process space 28 were discussed above in FIG. 1A and will be discussed further in conjunction with FIG. 2. Web server 29 is an additional web server that may be separate from network interface 20 and/or system 16. In other words, web server 29 may be part of system 16 or a separate entity. Web server 29 has either direct access or access via network 14 to tenant database 22. Web server 29 hosts websites on behalf of the tenants of system 16, where each website may be customized to at least some of the individual needs of that particular tenant, based on information in tenant database 22.

Figure 2:
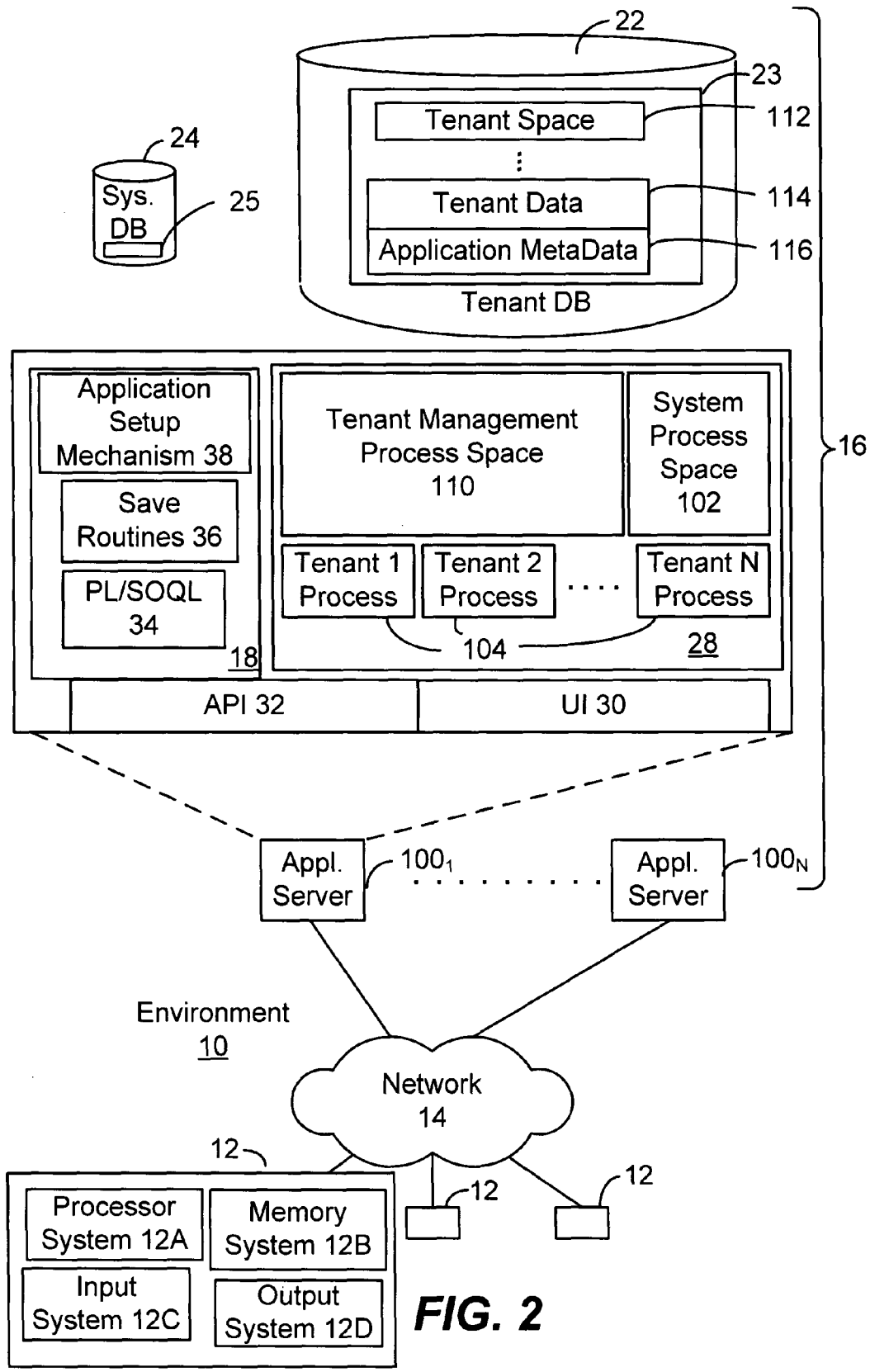
FIG. 2 illustrates a block diagram of an embodiment of elements of FIG. 1A and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface for resident processes of system 16 to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber, such that the invocation of the metadata and executing the metadata behaves as an application in a virtual machine.

Each application server 100 may be communicably coupled to database systems, e.g., having access to system data 25 and tenant data 23, via a different network connection. For example, one application server 100, might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Throughout the remainder of this specification, the word "client" (when used to designate a type of user) is used to refer to clients of the tenants. Although the tenants are also clients of the system 16, the tenants will be referred to as tenants instead of as clients. Until this point the user systems were assumed to belong to tenants of system 16. However, some of the user systems 12 are clients and/or customers of others of those running others of user systems 12. Those of user systems 12 that are clients or customers of other user systems 12 may not be tenants of system 16. In the remainder of this specification most of the references to user systems 12 may refer to user systems that are not run by tenants of system 16 and/or user systems of tenants that are acting in a role similar to their clients.

Client System

Figure 3:
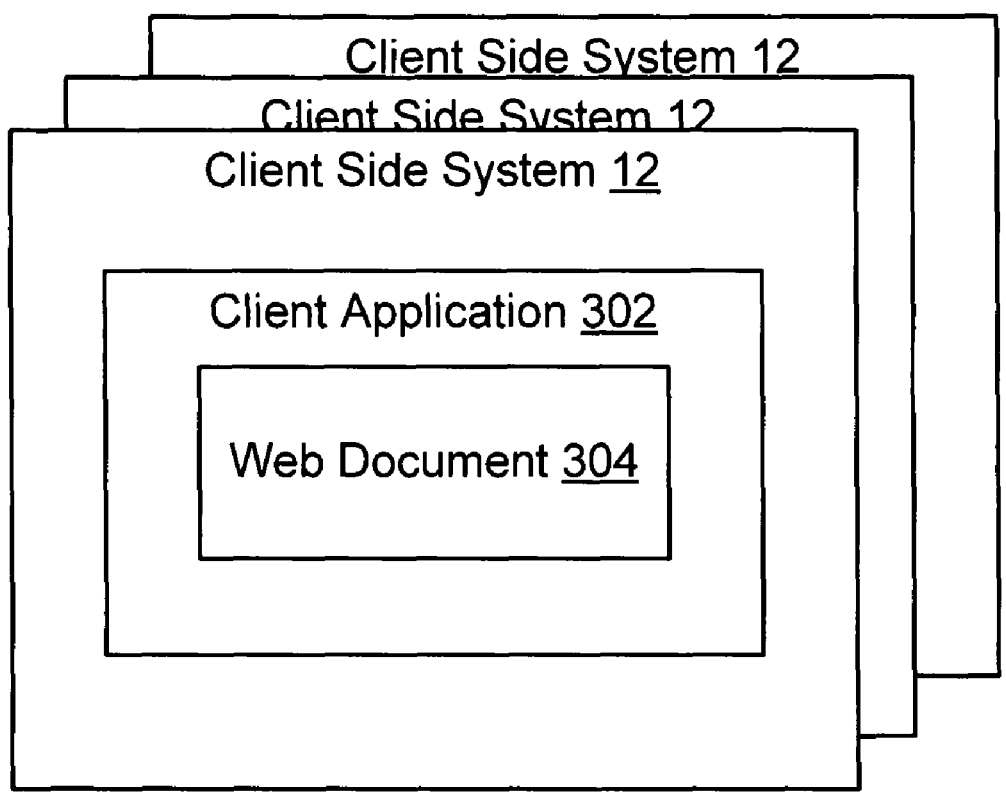
FIG. 3 shows a block diagram of an example of a view of an embodiment of a client of FIGS. 1A, 1B, and 2.

FIG. 3 shows a block diagram of a view of an embodiment of user system 12 (FIGS. 1A, 1B, and 2), which may include client application 302 and client document 304. In other embodiments, client application 302 may not have all of the elements listed and/or may have other elements instead of, or in addition to, those listed.

Client application 302 is an application for interfacing with a network and for viewing information, such as webpages that are available via a network. The webpages may include webpages associated with an idea website for posting ideas. An HTTP client is an embodiment of client application 302. Client application 302 is a set of instructions stored on memory system 12B, which are implemented by processor system 12A (FIG. 2). The client associated with client application 302 may be a customer of one of the tenants of system 16 (which is just one example of a sponsoring organization associated with the idea website). Web document 304 is a document that was received on client application 302, via input system 12C, and is viewed via output system 12D (FIG. 2), such as a webpage from the idea website.

Tenant Websites

Figure 4:
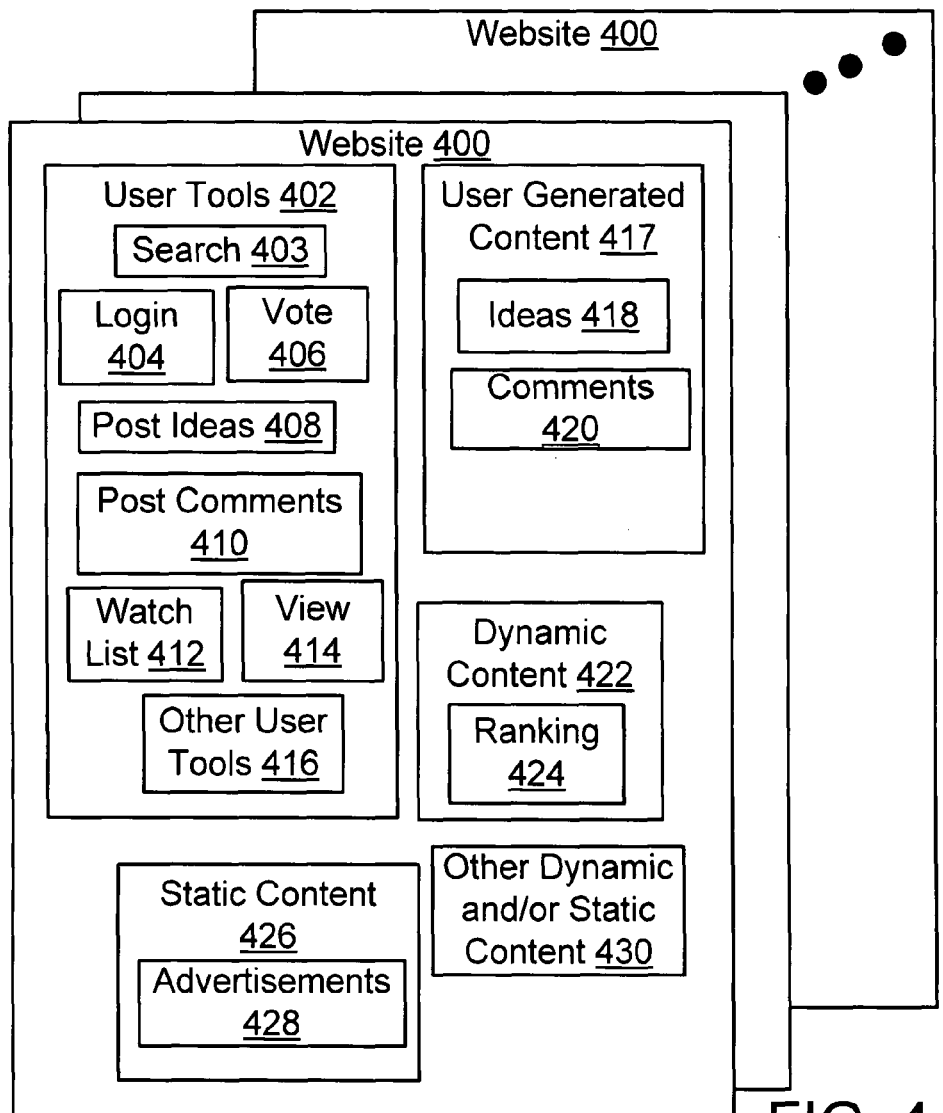
FIG. 4 shows a block diagram of an example of a series of websites associated with the system of FIGS. 1A, 1B, and 2.

FIG. 4 shows a block diagram of an example of a series of websites 400. Websites 400 have user tools 402, which may include search 403, login 404, vote 406, post ideas 408, post comments 410, watch list 412, view 414, and other tools 416. Websites 400 may include user generated content 416, which may include ideas 418 and comments 420. Websites 400 may include dynamic content 422, which may include ranking 424. Websites 400 may include static content 426, which may include advertisements 428. Websites 400 may also include other dynamic and/or static content 430. In other embodiments, websites 400 may not have all of the elements listed and/or may have other elements instead of or in addition to those listed.

Websites 400 are embodiments of web document 304 (FIG. 3). Each of websites 400 may be associated with (e.g. used by) a different tenant as an idea website. In an embodiment, each of websites 400 that are associated with a different tenant are stored in a different area, such as a different tenant data 114 in a different area of tenant space 112 (FIG. 2), to facilitate maintaining multiple websites for different tenants. In an embodiment, the users of one of websites 400 (that is associated with a particular tenant) are kept isolated from the users of other tenants (in addition to being isolated from one another) even though each of the idea websites are provided by the same service or by the same multitenant system (e.g., system 16). In an embodiment, when a tenant's customer creates an account with the tenant, the account is on the tenant's community site (e.g., stored in tenant space 112 of system 16), and thereby kept completely isolated from customer accounts of all other tenant idea websites.

In an embodiment, websites 400 may be used for internal purposes or external purposes. For example, a tenant may have one of websites 400 configured for employees to give feedback on the direction of the company or improvements the company could make. In this embodiment, access to the website may be limited to employees. In another embodiment, only special customers (or a set of special customers) are allowed access to their own exclusive version of the website so that they can give feedback that might not be appropriate for other members of the public to see. In an embodiment, any of websites 400 may be limited to any group of people from which it is desirable to get feedback via allowing the group of people to vote on ideas. Information about the votes may be correlated to other information. For example, the vote information may be correlated to other information about the voters.

Websites 400 may be part of hosted Customer Feedback Management (CFM) systems, which may be customer feedback management systems for each of the tenants having a CFM to manage feedback from the tenant's customers. Since the CFM is a hosted application (e.g., hosted by system 16), in an embodiment, the tenant does not need to install or setup the CFM and does not need a database administrator to manage the CFM. Websites 400 may provide product teams of the tenants with a better insight into the needs of the customers of the tenants. The feedback may help give the customers of the tenant a feeling of empowerment and give the business input that may help improve the services and/or products that are provided. Since the customer of the tenant feels empowered, customer loyalty is enhanced. The increased customer retention and loyalty for the tenant, may result in increased revenues. Receiving customer feedback from the customers of the tenant, may facilitate allocating scarce resources to the areas that are more likely to generate higher returns for the tenant. Customer feedback from the customers of the tenant may facilitate recognizing and addressing problems and opportunities relatively soon after the problems and opportunities arise.

Using the CFM system associated with websites 400, the tenant and the tenant's customers can co-innovate, which may further increase customer satisfaction of the tenant's customers. Websites 400 may function as 24 hour-7 day a week, global, low cost customer focus groups at a fraction of the cost. For a fraction of the continual cost of running focus groups and marketing studies, the tenant associated with a given one of websites 400 can obtain the same or similar information by providing the tenant's user community with the feedback tools allowing for a two way dialogue.

To elaborate, in traditional models for capturing customer feedback information flows in one direction in that users submit information and the information is captured. After capturing the information, there is no further discussion with the one that suggested the idea. Many times feedback from the users is not relayed to the people most suited for addressing the issues raised. Even when the feedback is relayed to the people most suited for addressing the issues raised, it may be impossible for the person assigned to address the issues to ask follow up questions. Regional user group meetings have also been used for interactive mediums to converse with customers of the tenant. However, focus groups and regional user groups are costly and time-consuming to run. In addition, the quality of information that is collected is different for different user groups. Websites 400 provide an alternative way for the tenants to capture information from the tenants' customers in a continuous manner on a global scale and at a fraction of the cost of the focus groups.

The CFM associated with one of websites 400 may harness the creative energy of the customers of the corresponding tenant by creating a two way communication between the customers of the tenant and the management, product teams, and/or product marketers of the tenant. In an embodiment, the hosted software for providing websites 400 (e.g., which may be stored within and run by system 16) may be robust in that the hosted software may be used by many different tenants having a variety of platforms. In an embodiment, websites 400 may be customizable for a specific site's specific needs. The websites 400 facilitate encouraging the tenants' customers to give indications as to what features the customers really need and which features the customers do not find important.

The tenant's user community submits feature requests and product ideas. Other users vote on which ideas those users agree with and which ideas those users disagree with. Additionally, the other users may contribute their own solutions to the same problem (as well as other problems). Product marketers and management can engage the community of the tenant's customers in a conversation to better understand the feature requests and ideas posted and to better understand the issues motivating the feature requests.

Regarding the CFMs associated with websites 400 increasing customer loyalty, when the tenant's customers are included in the innovation process, the tenant's customers feel a sense of ownership and alliance with the product and the tenant. Consequently, the tenant's customers are more likely to buy future products and/or services from the tenant, recommend the tenant's service to the peers of the tenant's customers, and help others of the tenant's customers with their problems.

When the tenant is around the tenant's own products for extended durations of time (e.g., 8 hours a day, every day), the tenant is more likely to overlook many possible product improvements, because the tenant tends to adapt and work around minor problems. However, if the tenant makes it easy for the tenant's customers to give feedback to the tenant on how to help improve the tenant's customer's experience, many easy to implement changes may be suggested. The customer feedback from the tenant's customers may help the tenant identify potential problems earlier than without having any of websites 400 and make use of the creativity of the tenant's customers. Implementing the suggestions of the tenant's customers may add new uses and functions to the tenant's product and/or services.

Paying attention to the suggestions of the tenant's customers may reduce the chances of wasting scarce resources in areas where there is little demand. By upgrading the areas that the tenant's customers indicate are desirable may increase sales and profits. Companies, such as the tenants, often spend tremendous amounts of money on advertisements that appear in the margins and elsewhere in webpages associated with search engines. However, users are more likely to select a search result rather than an associated advertisement. By creating a well-used community site, such as one of websites 400, which may include many pages for users to post ideas and generate content, the visibility of the tenant's company and the tenant's products is increased on search engines. As a result of the usage of websites 400 for receiving feedback and communicating with users, websites 400 generate more traffic, which may lead to websites 400 having a higher ranking on results lists produced by search engines. Specifically, since more people are accessing, and adding content to, the website more frequently, the search engines tend to rank the references to the tenant's website, services and/or products in the results list. Consequently, the tenant's website, services, and/or products appear higher up on the results list—closer to the top of the results list. In an embodiment, no matter how many users visit/use the tenant's idea website, a flat rate is charged for the service of providing the webpage to the tenant. In other embodiments, other pricing schemes may be used.

In one embodiment, the CFM system via website 400 may provide tools (e.g., which are made available via system 16 of FIG. 2 or web server 29 of FIG. 1B) that allow the customer to submit an idea, vote on an idea, comment on an idea, save ideas posted ideas, and/or report abuses. Additionally, the CFM may allow users posting ideas to upload images and screenshots for inclusion in the posting. The voting mechanism allows the host's user community to provide input into which feature requests and suggestions are important to the user community and which feature requests and suggestions are not important to the user community.

User tools 402 are a set of links that initiate a set of instructions (which may be stored in system 16 of FIGS. 1A-2 or web server 29 of FIG. 1B) that cause a set of operations to be performed. Search 403 is a field in which the user may enter a search term to find content within one of websites 400 stored in tenant data 114. Login 404 is one or more instructions (which also may be stored in system 16 of FIGS. 1A-2 or web server 29 of FIG. 1B) that present a group of fields to the user within which the user enters a password and/or a user name in order to gain entry. The one or more instructions of login 404 cause a processor to decide whether to grant or deny access to the user based on the user's entries, and then either grant or deny access to the user. In an embodiment, some of the tools, such as those that relate to voting, watch lists, posting ideas, and posting comments are only available after logging in, while other tools such as those related to viewing posted ideas, viewing posted comments, and viewing TQMCs are available without logging in. In an embodiment, login 404 may present the same login to a user whether the user attempts to access a particular one of websites 400 or whether the user attempts to access another website that is associated with the sponsor of the particular website.

Vote 406 is a set of one or more instructions (which may be stored in and retrieved from system 16 of FIGS. 1A-2 or web server 29 of FIG. 1B) for a user initiated process for voting on an idea. In an embodiment vote 406 weights each vote according a variety of factors, which may be unique to each tenant and/or may be stored in tenant data 114. In an embodiment, vote 406 may weight each vote according to the style of voting. For example, if a particular user tends to only vote infrequently, that user's vote may be given a higher weight on the assumption that the user that votes infrequently only votes on items that the voter feels are important. A vote related to a particular feature from a user that frequently uses that particular feature may be weighted higher than a vote from a user that does not use that particular feature. In an embodiment, weights may be discerned from information retrieved from system 16, such as the level of service or amount of business conducted by the user or a customer of the tenant that is associated with the user. For example the weight may vary depending on whether the user is associated with a platinum level customer, the number of purchases recently made by the customer, the number of licenses purchased by the customer, and/or other factors. In an embodiment, vote 406 may include votes for an idea and/or votes against an idea (the user may "vote down" and idea).

In an embodiment, each vote is multiplied by an increasing function of time and then tallied to form the TQMC. After a certain amount of time is passed the votes are all normalized by dividing by a large number, the multiplicative factors (which are used as weighting factors) are all also decreased. For example, all votes received at a first time are multiplied by 1 before summing the new vote with the remaining prior votes. At a later time, all votes received are multiplied by 2. Thus, if 10 votes were received during the first time and 20 more votes were received at the second time, the weighted sum of the votes received at the first time had a value of 10 and the weighted sum of the votes received at the second time had value of 40. Consequently, the total weighted sum of the votes received at both times becomes 40+10=50, which is the TQMC of the idea if no other weights and QMC are included in the TQMC.

Continuing with this example, if at a third time the multiplicative factor increases to 4, and only 2 votes are received at the third time, the contribution for the third time is the weighted sum 4×2=8, and after adding the votes from the third time, the weighted sum of the votes is computed as 8+50=58. If after the third time it is time to normalize the votes, and if the vote is normalized by dividing by 10, then after the third time the vote becomes 5.8, and the multiplicative weight may be reduced back to 1 for votes received at a fourth time. The cycle may then be repeated for the times during the next time interval prior to the next normalization at which votes are received. The cycle is then repeated for the fourth, fifth, and sixth time intervals in the same manner as the cycle was performed during the first, second, and third time intervals. Although in this example, a normalization of 10 was used, and votes were received at only three distinct times during the period between normalizations, these values were chosen for simplicity, and the invention is not limited to the specifics of this example. Also, in the above example, no distinction was made between different votes other than the time at which the votes were received and/or sent. However, in an embodiment, different votes may be weighted differently according to other factors in addition to the time at which vote was received or cast.

As an explanation, the longer an idea has been posted the more votes it will tend to accumulate. Thus, the older ideas may have more votes just because the older ideas have been posted longer even though the older idea may in fact be less popular. In order to counteract this phenomenon vote 406 may assign less weight to older votes. The manner of decreasing the value of the vote could be by performing an operation on each vote. For example, consider a case in which a particular user voted on a particular day and after weighting the vote it was given a value of 10. Some time later one may want to decrease the value of that vote by performing an operation such as a square root.

However, to perform an operation on each vote every time there is a desire to decrease the weight of the vote is computationally intensive. Instead, the votes for an entire period of time in which the votes of that time period are to have equal weight may be summed and the sum may be multiplied by the weight. Multiplying each new vote by an increasing number has the same effect of decreasing the relative importance of the earlier votes. In other words, multiplying each new vote by an increasing number increases the weight of the new votes and thereby has the same effect as decreasing the relative importance of the earlier votes. Dividing by a large number (or multiplying by a small number) prevents overflow errors. The number used for the normalization is large enough (if dividing or small enough if multiplying) so that no overflow errors are expected to occur prior to the next normalization.

To reiterate in further depth, by using a weighting of the votes that causes the TQMC of the older votes to decay exponentially and optionally by weighting new votes by a time dependent increasing weight allows the application to be scaled with time, which simplifies computing the TQMC on multiple sites. By using an exponentially decaying function the contribution that a particular vote or a particular set of votes will have at a later time can be predicted. Specifically, the decay is similar in functional form to radioactive decay, which involves an exponential function the weighted value of the vote is given by $$V_i(t) = A e^{-(1/\lambda)t},$$

where $t = (t_{now} - t_{time\_of\_vote})$, e can be the number e (2.71..., which may be referred to as Euler's number or Napier's constant) or any constant C, A is the weight of the vote, λ is a decay constant from which the half life can be computed (the half life is a lapse of time when the vote value becomes half the initial value). If e is 2.71..., then the half life of a vote is equal to $\lambda(\ln(2))$. If e equals C, then the half life equals $\lambda \log_C(2)$), where $\log_C$ is log to the base C. If C is equal to 2 (and e is C), then the half life equals λ, because if C=2, $\lambda(\log_C(2)) = \lambda(\log_2(2)) = \lambda(1) = \lambda$. As an example of how values may be assigned to A, A may be 10 points if the voter is a registered user, and A may be 3 points if the voter is a guest user.

The total value of an article at any time is $$\sum_i V_i(t),$$

where i is equal to a number between 1 to n, n is the number of votes on the article so far, and t=time right now. Exponentials have a property that at any one time, one only needs to know the current value of the tally of the votes, and then the contribution of the current tally to the full tally can be determined for the rest of the life of the tally. Further, if the contribution of any one vote or of any combination of votes is known at any one time, the contribution of those votes to the tally is known for all future times. In that sense, the tally from an exponential decay does not require the storage of individual votes. In other words, the details of the tally of past votes do not matter. All that is necessary to store is the current tally of the vote and the rate of decay (the decay constant and the value for e or C).

Regarding computing the TQMC of an idea (e.g., an article describing an idea), anytime it is desired to compute the TQMC of an idea, all that is needed to know is what the TQMC was the last time the TQMC was computed. Based on the last TQMC computed, the time elapsed (e.g., 2 days), and from of the exponential decay, the contribution to the current TQMC can be computed. For example, if the TQMC was 4, if C is 2, and if λ is 2 days, then the half life is 2 days. Consequently, if 2 days ago the TQMC was 16, and if no new votes were received in the past 2 days, then the current TQMC will be 8.

By using an exponential decay it is not necessary to record the value of each vote, record when each vote was received or sent, apply a function to the vote to compute the new value, and then sum the results. By using exponentials instead of storing each vote value, only the last value needs to be stored.

An additional property of the exponential decay is that if two ideas are given a particular pair of TQMCs, if no new votes are received, the idea with the higher TQMC will always have the higher TQMC. For example, if a first idea had a TQMC of 100 at a time when a second idea had a TQMC of 90 and if no new votes are received, the first idea will always be ranked higher than the second idea no matter how much time elapses. Consequently, the only time calculations need to be performed is when someone votes on the site. At that time, one can just decay all the TQMCs on all the ideas, update the TQMCs to obtain the new TQMCs for the idea that was just voted on. More specifically, a nice feature of an exponential is that even when dealing with an aggregate value (e.g., the TQMC), the exponential ensures that each vote decays in the same manner and contributes the same amount to the aggregate value, even though only the aggregate value (e.g., the TQMC) is computed and stored. Thus, as a result of having each vote decay in the same manner, the exponential makes the vote contribution consistent regardless of when the vote occurs in the lifetime of an idea. Further, as a result of having each vote decay in the same manner, the exponential makes it easy for any user to understand how their vote behaves and how the user's vote contributes to the total TQMC, while allowing the hosts of websites 400 to use the aggregate value as a shortcut in computing the decay.

Thus, the exponential saves significant Central Processing Unit (CPU) resources, because there is no need to recalculate the TQMC every time someone loads the page. In order to ensure that two TQMCs for two different ideas have decayed by the same amount it may be desirable to compute the decay for all TQMCs of all ideas when each vote is received. However, it may still be computationally intensive to recalculate the TQMCs of each and every idea every time someone votes on an idea. Consequently, instead of recalculating the new decayed value every time, the value of each new vote may be increased exponentially (instead of decaying the current TQMC exponentially). Consequently, when a new vote is received, the TQMC of only one idea needs to be updated, which is the idea for which the vote was received. In an embodiment, the time dependent weight that is used for multiplying the new vote is a continuous function of time, such as $e^{t/\lambda}$, $2^{t/\lambda}$, or $C^{t/\lambda}$, where here t is the time elapsed since the last normalization, and $$V(t) = \sum_i V_i(t) = \sum_i A_i C^{t_i/\lambda},$$

where C is any positive number, such as e or 2, and $t_i = t_{now} - t_{time\_of\_normalization}$. In this context, the time is continuous within a predefined tolerance, such as within one second, within one thousandth of a second or within $1 \times 10^{-7}$ of a second.

Post ideas 408 is one or more sets of instructions for a user initiated process to post an idea. Post comments 410 is one or more sets of instructions for a user initiated process to post comments about an idea. Watch list 412 is one or more instructions for creating and/or editing a list of ideas that the user would like to track. In an embodiment, the user may receive alerts when a message thread that the user commented on is updated with another comment. The alerts may appear when the user logs on. In an embodiment, if the user is a guest, when the user just visits one of websites 400 the user receives an alert. An embodiment of the alerts is discussed below in conjunction with FIG. 14. View 414 is a set of one or more instructions for viewing ideas and comments about the ideas. Other tools 416 are other tools that may optionally be provided to the user.

User generated content 417 is the content on websites 400 that is generated by users. For example, ideas 418 are ideas that were posted by users via post ideas 408 and/or ideas posted by the tenant. Comments 420 are comments posted by the users, such as by post comments 410 (FIG. 4) and/or by the tenant.

Dynamic content 422 is content that changes, and the changes may be based in-part on user input or usage of websites 400. Dynamic content 422 may include ranking 424, which ranks the different ideas. When viewing the ideas posted via post ideas 408, as a result of ranking 424 the order in which the ideas appear may be in-part based on, or fully based on, the votes received via vote 406.

Static content 426 contains content that does not change often. An example of static content is advertisements 428. Other static and/or dynamic content 430 contains other static and/or dynamic content, if present. Some examples of other static and/or dynamic content 430 are instructions relating to how to use the user tools 402 or information about how many users have visited the one of websites 400. The instructions for user tools 402, which may include search 403, login 404, vote 406, post ideas 408, post comments 410, watch list 412, view 414, and/or other tools 416 may be stored in user data 114 and/or web server 29, and the user may be sent links to the instructions that initiate the instructions.

Voting on Quality Management Criteria (QMC)

Figure 5:
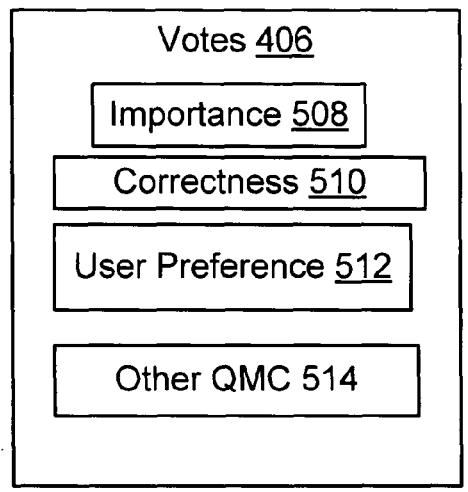
FIG. 5 shows a block diagram of an embodiment of an algorithm for voting on an idea.

FIG. 5 shows a block diagram of an embodiment of the algorithm associated with vote 406 (FIG. 4). Vote 406 may include importance 508, correctness 510, user preference 512, and/or other QMC 514. In other embodiments, vote 406 may not have all of the elements listed and/or may have other elements instead of or in addition to those listed.

There may be a variety of different types of quality management or other criteria for which the user may be given an option to vote when vote 406 (FIGS. 4 and 5) is implemented. Importance 508 may include a set of one or more instructions which when implemented allow a user to indicate whether the user believes the idea is important. Correctness 510, if present, may include a set of one or more instructions which when implemented allow a user to indicate whether the user believes the idea is correct. User preference 512, if present, may include a set of one or more instructions which when implemented allow a user to indicate whether the user believes that the idea is good whether or not the idea as posted is correct or important. Other QMC 514, if present, may include one or more other quality management criteria on which the user is given an opportunity to vote.

Some Viewing Options

Figure 6:
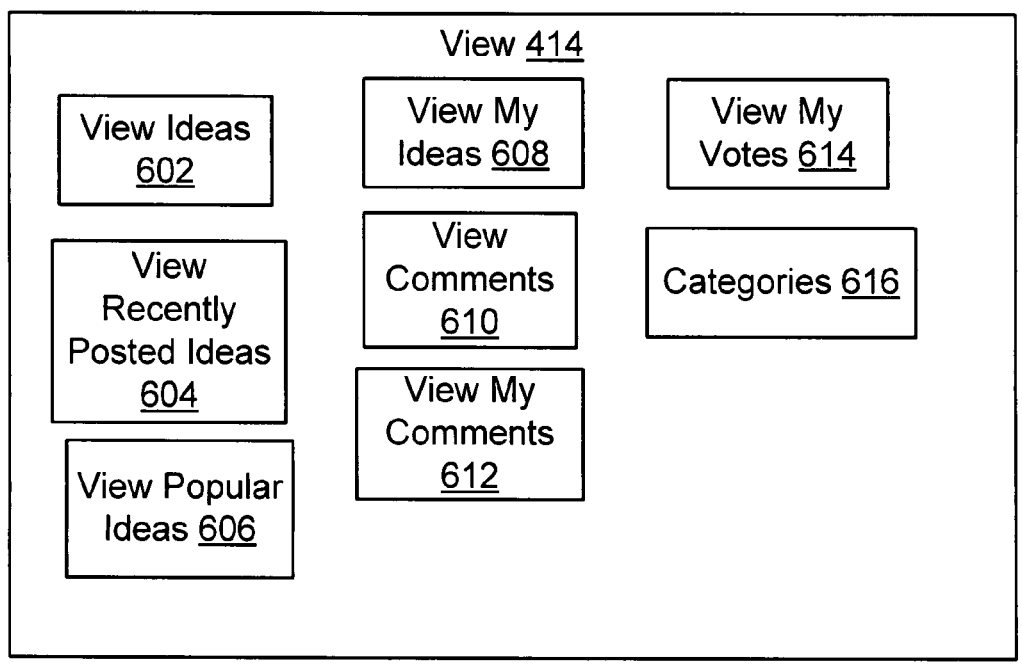
FIG. 6 shows a block diagram of an example of an algorithm of the websites of FIG. 4 for displaying various web pages.

FIG. 6 shows a block diagram of an example of an algorithm associated with view 414 (FIG. 4). View 414 may include view ideas 602, view recently posted ideas 604, view popular ideas 606, view my ideas 608, view comments 610, view my comments 612, view my votes 614, and categories 616. In other embodiments, view 414 may not have all of the elements listed and/or may have other elements instead of or in addition to those listed.

View ideas 602 brings the user to a webpage in which the ideas are listed in the order in which the ideas are ranked. View recently posted ideas 604 brings the user to a webpage in which the ideas are listed that were posted within a predetermined time period of the current date. View popular ideas 606 brings the user to a webpage in which ideas are listed that have a number of votes that is within a certain threshold of the most popular idea. In another embodiment, the user is brought to a page in which a predetermined number of ideas are listed and the ideas listed have the most votes. View my ideas 608 brings the user to a webpage in which the ideas the user posted are shown. View comments 610 brings the user to a webpage in which the comments that are related the idea currently being viewed are shown. View my comments 612 brings the user to a webpage in which the comments that the user posted are shown. Optionally, the ideas, the votes, and/or other people's comments about that idea are also shown. View my votes 614 brings the user to a webpage in which the ideas that the user voted on as well as the current number of votes received for that idea are shown. Optionally, the ideas and the comments about the ideas are also shown. Categories 616 allows the user to select one of a particular group of categories. Once a category is selected, the user is brought to a webpage that shows ideas that relate to the selected category.

Web Server for the Tenant Websites

Figure 7:
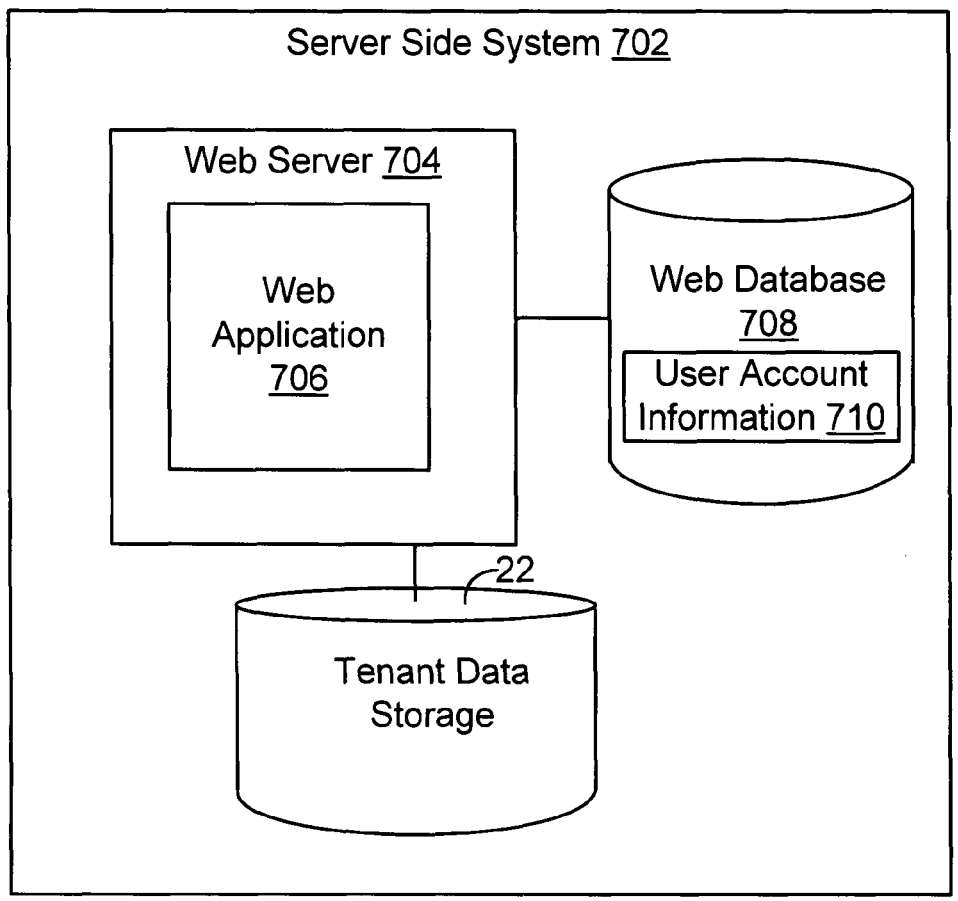
FIG. 7 shows a block diagram of an example of a server side system.

FIG. 7 shows a block diagram of an example of a server side system 702. Server side system 702 may include tenant database 22 (FIGS. 1A, 1B, and 2) and web server 704, which may include web application 706. Server side system 702 also includes web database 708, which in turn may include user account information 710. In other embodiments, server side system 702 may not have all of the elements listed and/or may have other elements instead of or in addition to those listed.

Tenant database 22 was described in conjunction with FIGS. 1A, 1B, and 2. Web server 704 sends web pages of one of websites 400 to user system 12 (FIGS. 1A, 1B, and 2). In an embodiment, tenant database 22 may store information associated with websites 400. The information associated with each website may be stored in tenant data 114. Web server 704 may be part of network interface 20 (FIG. 1A), an embodiment of web server 29 (FIG. 1B), another part of system 16, or may be communicatively connected to system 16 via network 14 (FIGS. 1A, 1B, and 2). Web server 704 may be an HTTP server or another type web server. Web server 704 may also be communicatively connected to user system 12 via network 14. Web application 706 includes one or more instructions that cause a processor to render a webpage. Rendering a webpage may involve performing computations, such as updating the current value of the vote, and accessing one or more databases for recording and retrieving information. Web database 708 is a database associated with web server 704. As a result of implementing web application 706, web server 704 may access web database 708 to store information received from user system 12. Web server 704, as a result of implementing web application 706, may also retrieve information from web database 708 and/or tenant database 22 that is needed for computations made by web application 706 and/or for rendering a web page of one of websites 400 to send to user system 12. Web database 708 may store information necessary for rendering webpages associated with one or more of websites 400 (FIG. 4). User account information 710 stores information about the users of one of websites 400. User account information 710 is one or more locations within the computer readable medium (or media) where information about the user accounts is stored User information may be stored in a location within tenant data 114 (FIG. 2) in addition to or instead of user account information 710.

Web Application for Tenant Website

Figure 8A:
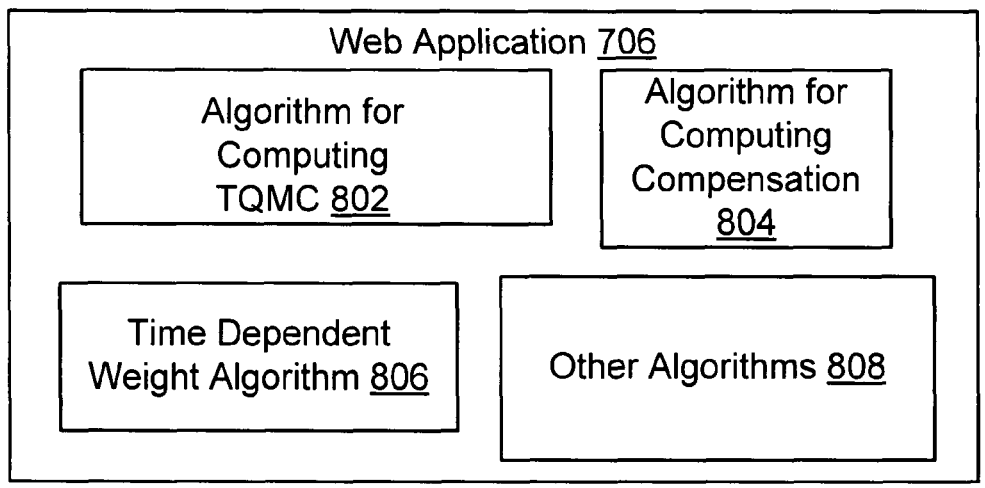
FIGS. 8A-C shows block diagrams of an example of a web application, setup routine, and administrative tools.

FIG. 8A shows a block diagram of an example of web application 706 (FIG. 7). Web application 706 may include algorithm for computing TQMC 802, algorithm for computing compensation 804, an algorithm for computing a time dependent weight algorithm 806, and other algorithms that support web documents 808. In other embodiments, web application 706 may not have all of the elements listed and/or may have other elements instead of or in addition to those listed.

Algorithm for computing TQMC 802 may compute the ranking associated with ranking 424, by computing the TQMC. Algorithm for computing TQMC 802 may be based on the same qualitative management criteria that are voted upon by votes 406 (FIG. 4). Other criteria that are not obtained by voting may also be included in the TQMC. Algorithm for computing TQMC 802 may compute one ranking (e.g., a ranking that is not a TQMC) that is seen on one of websites 400 (FIG. 4) and another ranking (e.g., the TQMC) that is used by the tenant associated with one of websites 400. Various factors that may determine the weight of a vote are the time of the vote, style of voting, or site management weightings selected prior to being tallied. For example, votes may be weighted by weights that cause older votes to have less importance than more recent votes. The relative weight of the older votes may be a decaying function of time. In an embodiment, the decaying function of time is accomplished by multiplying the new votes by an increasing function of time. The articles may be displayed to other users in the community in ranked order in which the ranking is based on a value associated with the Total Qualitative Management Criterion.

Algorithm for computing compensation 804 may compute the compensation given as a result of advertisements shown on one of websites 400 (FIG. 4) or as a result of advertisements not being shown on the website. In one embodiment, advertising based revenues may be earned from advertisers posting advertisements on one of websites 400. In another embodiment, the tenants may pay a fee for having a website upon which customers and the tenants can post ideas. In another embodiment, advertising revenues may be shared between the sponsoring organizations and the company providing the website.

Time dependent weight algorithm 806 determines the value of the multiplicative weight by which votes are multiplied. Specifically, the difference in time, t, from the current time to the last time the TQMC was normalized is determined, a weight $A_{i+1}$, associated with this vote is determined, a decay constant $\lambda$ and base constant C are retrieved from memory, and the new TQMC is computed as $R(t_{i+1})=A_{i+1}C^{t/\lambda}+R(t_i)$, where $t_{i+1}$ is the current time and $t_i$ is the last time that someone voted for the current idea. After the conclusion of a time period the votes of the entire website are all divided by a large number (or multiplied by a small number), and the multiplicative factor is reduced back to an initial value. Other algorithms 808 include other algorithms used to support one of websites 400 (FIG. 4).

Setup

Figure 8B:
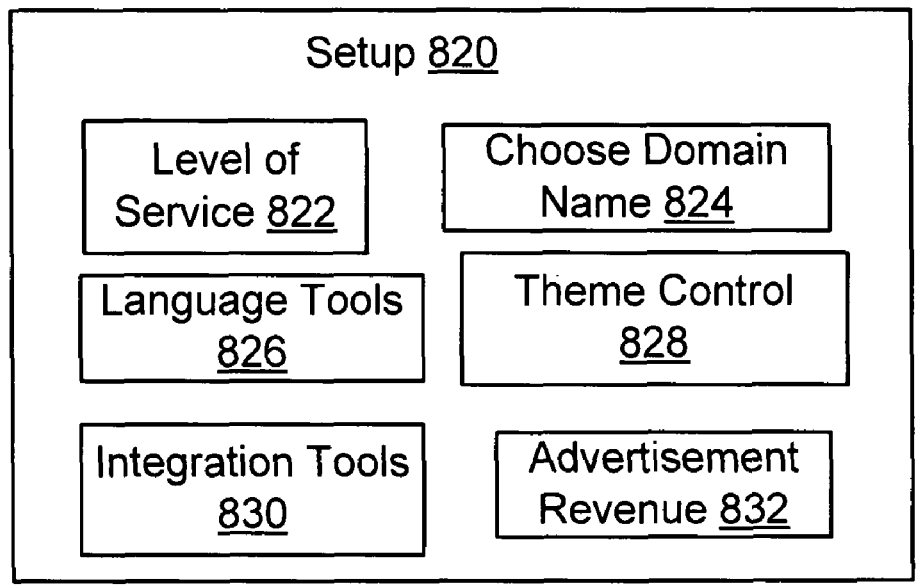

FIG. 8B shows a block diagram of an embodiment of setup 820. Setup 820 may include level of service 822, choose domain name 824, language tools 826, theme control 828, integration tools 830, and advertisement revenue 832. In other embodiments, setup 820 may not have all of the elements listed and/or may have other elements instead of or in addition to those listed.

Setup 820 is software for setting up and configuring one of websites 400. Level of service 822 may include software, such as user interface for receiving a request for a particular level of service and/or may include software for providing certain features to the tenant, based on a level of service selected. For example, the CFM system associated with one of websites 400, via level of service 822, may offer different levels of service to different tenants. In one embodiment, there may be four levels of service. At the lowest level of service, the CFM system associated with one of websites 400 may include services that allow the customer to submit an idea, vote on an idea, comment on an idea, save ideas posted ideas, and/or report abuses. The CFM system associated with one of websites 400 may provide the tenant the ability to group ideas according to categories and obtain statistics about the ideas, votes, and comments. The CFM associated with one of websites 400 may allow advertisers to advertize using custom ads. At this level of service, advertisements may be allowed to appear on one of websites 400 in exchange for the tenant having use of the website at no charge or at a reduced fee.

At a second level of service, chosen via level of service 822, in addition to the services provided at lower levels, the CFM associated with one of websites 400 may allow the tenant to remove advertisements and may allow the tenant to choose the domain name associated with the idea website.

At a third level of service, chosen via level of service 822, in addition to the services provided at lower levels, the tenant may be provided with moderation tools for moderating posted content, and/or the tenant may be provided the option of customizing the text of the static content of one of websites 400. Another feature that may be provided at this level is the tenant may be allowed the option to give different users different levels of access.

At a fourth level of service, chosen via level of service 822, the CFM via websites 400 may solicit ideas related to particular themes. In addition to services provided at lower levels of service, the CFM associated with one of websites 400 may be associated with a domain name and allow customized labels of different portions of the website (which is discussed further below). The CFM associated with one of websites 400 may include community moderation tools and offer privacy control to the tenant's and/or customers of the tenant (which are discussed further below). The tenant may be provided with analytical tools for analyzing the feedback of the tenant's customers, a tool for downloading data about the user's posted ideas, other customizations of one of websites 400. In other embodiments there may be different levels and/or different numbers of levels instead of the four levels listed above.

Choose domain name 824 allows the tenant to choose a domain name, such as "share.yourcompany.com," instead of having a domain name, such as "accountname.crispyideas.com" that references the service providing the CFM associated with one of websites 400 (e.g., FIG. 4) so that the user associates the website with the tenant and the website appears to the user as one of the web pages of the tenant's website. Choose domain name 824 may further increase the tenant's rankings in a results list and generate more traffic from search engines. More visitors to the tenant's idea website may lead to more customers and more visitors of the tenant's main site at "yourcompany.com."

Language tools 826 may be provided for setting up one of websites 400 in a particular language by, for example, selecting the language from a selection of languages available in an administrative tool panel. Additionally, the tenant may be provided with tools, within language tools 826, for inputting a translation provided by the tenant. When using language tools 826, the tenant may select a desired language, and then click on the translation tool to translate that the text associated with one of websites 400 into the desired language. Additionally, sometimes the tenant may want to change only certain items for the CFM associated with one of websites 400 or for just one of a plurality of CFMs associated with the websites 400 associated with a tenant, but not for any other site. For example, perhaps the tenant would like to replace=the word "Ideas" with "Ideagrams" or something that is more appropriate for that tenant. Language tools 826 may allow a tenant to have specific translations for the tenant's CFM site that are different than the translation used by other tenants or that no other tenant has.

Theme control 828 may provide tools are provided the user for theme control. However, in order to reduce the complexity of providing the CFM associated with one of websites 400 to the tenant, there may be limitations to the number of files that the tenant can change. In an embodiment, certain tenants or all tenants may be allowed to edit all editable files in order to maximize customizability of the CFM associated with one of websites 400. Theme control 828 may include choose domain name 824 and/or language tools 826.

Integration tools 830 allow the tenant to integrate the login of webpage 400 with the login of another website of the tenant. For example, the login routine called may be the same login routine (having the same user data) as the login routine that is triggered when a user attempts to login to a secure part of one of websites 400 associated with the tenant. Alternatively, during set up, system 16 may request information identifying the location of the tenant's login routine, which is called whenever a user attempts to access a secure part of the one of websites 400 that is associated with the tenant or a secure part of the tenant's other website. A container may be set up by web server 704 that stores one or more pointers to the tenant's login routine and/or other part of the tenant's other website. Integration tools 830 may also include other tools for changing the look and feel of websites 400 and/or the other website of the tenant so that the two websites appear as one website to the user. Integration tools 830 may allow the tenant to choose when and whether to initiate the integration process and/or to determine the degree of integration.

Regarding advertisement revenue 832, in an embodiment, a free edition of the CFM associated with websites 400 may be provided. To support the free edition, advertisements may be included with a first level of service. In an embodiment, there may be other levels of service (e.g., three or more levels of service) associated with websites 400 that may be free of advertisements. In an embodiment, the tenant may run advertisements on the CFM, which are paid for by advertisers for other products. In an embodiment, of the free edition, the tenant leaves the advertisements provided by the website service in the locations that are designated by the website provider.

Administrative Tools

Figure 8C:
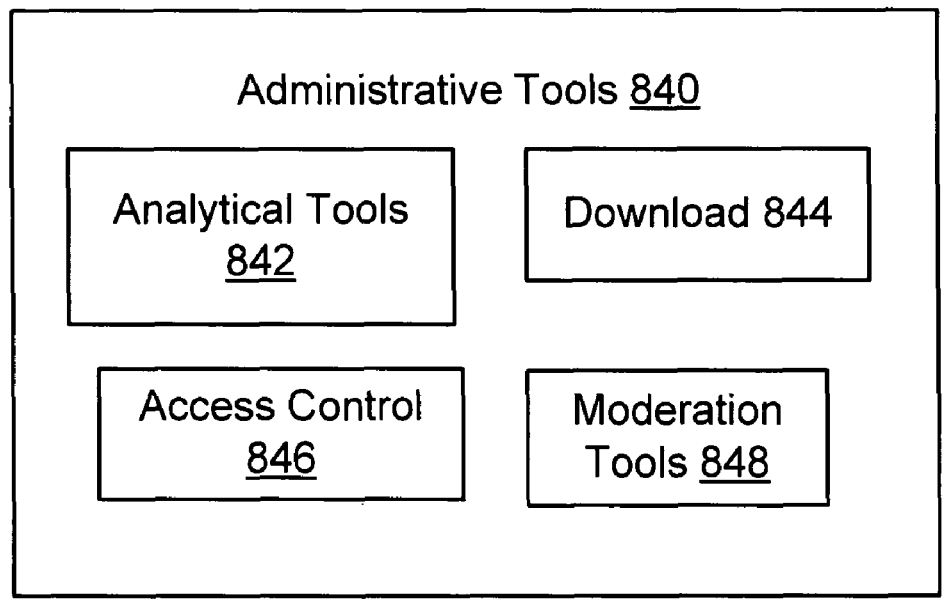

FIG. 8C is a block diagram of an example of administrative tools 840. Administrative tools 840 may include analytical tools 842, download 844, access control 846, and moderation tools 848. In other embodiments, administrative tools 840 may not have all of the elements listed and/or may have other elements instead of or in addition to those listed.

In an embodiment, administrative tools 840 may include a user interface has an appearance similar to a dashboard for managing the tenant's idea website of websites 400. The dashboard may include links for analytical tools 842, administrator management tools, and/or tools for configuring the tenant's idea website of websites 400 and language tools, for example. In an embodiment, the elements of setup 820 may be included within administrative tools 840, and the administrative tools are used for configuring websites 400 after websites 400 are created. In other words, in an embodiment, one of websites 400 may be available for use after being created with no further setup required by the tenant, but the tenant may be given administrative tools via which the given one of websites 400 may be configured or reconfigured anytime after the website is created.

In an embodiment, analytical tools 842 aid the tenant in analyzing comments, votes, and/or posts of the users and thereby may aid in determining which features of the tenant's website and/or product are most important, and which feature of the tenant's website or product are not priorities. Analytical tools 842 may allow the tenant to create online focus groups by grouping the customers associated with a particular segment of the market, and analyzing the patterns associated with the customers and/or ideas and posts of the customers of each segment. Analytical tools 842 may allow the tenant to graphically view the voting history on different ideas. Analytical tools 842 may be used to analyze site usage patterns to spot popular ideas, heavily discussed posts, the most recently posted posts, and/or the most active items, by providing different graphs and data views. Analytical tools 842 may retrieve vote information, information about the voters casting the votes, and/or other information from tenant data 114 (FIG. 2), which may maybe presented and/or correlated (e.g., via one or more graphs or plots) so that the absence and/or presence of relationships may be derived.

Download 844 may be provided in certain editions of the CFM associated with websites 400, which allows data about the posts and comments to be exported from system 16 to the tenant's site, so the tenant can grab all of the data and bring it into the tenant's own data systems. Once in the tenant's own data system, the data may be further analyzed and manipulated using the analytical tools provided by the system 16 and/or using the tenant's own analytical tools. In an embodiment, download 844 may allow a tenant to export data to another application. For example, data from one of websites 400 may be exported to software used by a salesperson to keep track information relevant to different customers. Thus, for example, when a salesperson visits a customer site, the salesperson may have available information about ideas that are going to be implemented that will benefit that particular customer.

In an embodiment, at least some tenants are offered access control 846, depending of the level of service selected. Access control 846 may provide the tenant with the ability to restrict access to certain ranges of customers and approved user accounts. Access control 846 may be used for allowing access to only certain users to beta sites or to allow only employees of a tenant to access internally accessible sites, for example.

Moderation tools 848 may allow the tenant to moderate any post or comment, before the post or comment is published on one of websites 400. Moderation tools 848 may facilitate reducing the likelihood of unruly users, or preventing unruly users from, posting comments or ideas, and/or may reduce the likelihood of (or prevent) heated conversations from getting out of hand. Using the moderation tools 848, administrators may be able to control the tone of the message boards. In an embodiment the moderation tools 848 can be enabled or disabled at any time. In an embodiment, websites 400 may include spam guards (which may be among the moderation tools) that require authentication prior to allowing guests to provide comments and posts. Moderation tools 848 may additionally provide more control over the comments and posts that appear on one of websites 400.

Method of Using an Idea Website

Figure 9:
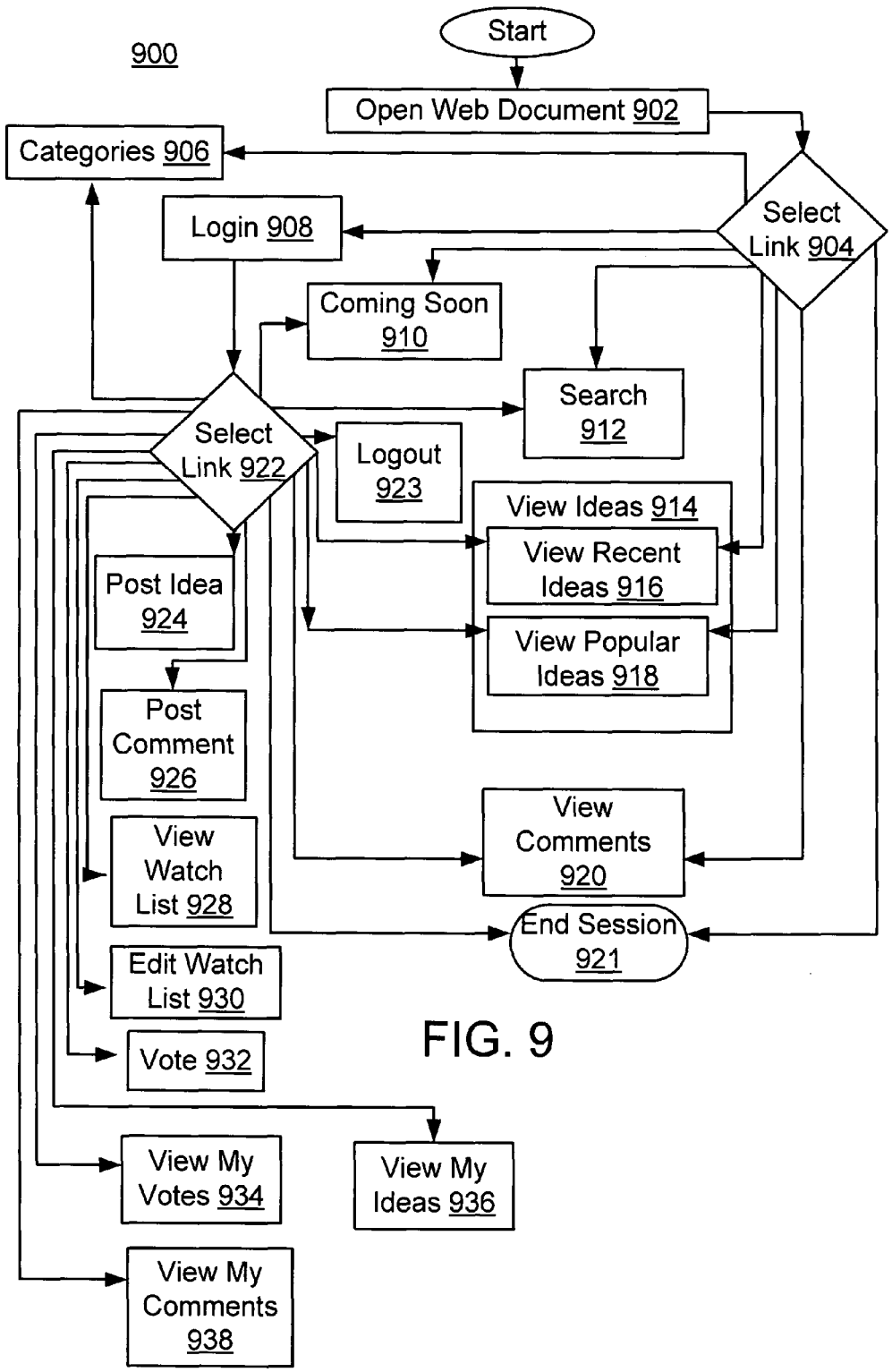
FIG. 9 shows a flowchart of an example of a method of using the websites of FIG. 4.

FIG. 9 is a flowchart of an example of a method 900 of using one of websites 400 (FIG. 4). In step 902, one of websites 400 is opened and presented for viewing on user system 12 (FIGS. 1A, 1B, and 2). In step 904, user system 12 and web server 704 (FIG. 7) wait for a selection selecting the next task to perform. While in step 904 the user may select to start any of a variety of tasks. If the user selects to view a category, method 900 proceeds to step 906. Selecting to view a category may involve the user selecting (e.g., clicking on) one of several categories, which takes the user to step 906, where the user is presented with ideas from the selected category. After step 906 is performed, method 900 is returned to step 904 to allow the user to choose another task. Upon returning to step 904, web document 302 (FIG. 3) may still display the category selected as a result of the completion of step 906. Although no return arrow is illustrated showing a return from step 906 back to step 904, method 900 proceeds from step 906 back to step 904. In general, although no return arrow is illustrated, after selecting a task while in step 904, method 900 performs the selected task and then returns back to step 904. The return arrows are not illustrated because the drawing would become too crowded, and would therefore be difficult to understand. Unless otherwise stated, it can be assumed that a return path exists from the task selected back to step 904.

Returning to step 904, if a selection is entered for logging in, method 900 proceeds to step 908 where user system 12 interacts with the user to receive login information for logging in, and decides whether to grant access to the user. If access is denied, method 900 proceeds from step 908 back to step 904. Below a discussion will follow about what happens if access is granted.

Returning to step 904, while in step 904 the user may select to perform a search by entering a search query into a search field. If the user selects to perform a search, method 900 proceeds to step 912, a search is performed by web server 704, search results are returned to user system 12 (FIGS. 1A, 1B, and 2), and the search results are displayed via client application 302 (FIG. 3) on user system 12.

Returning to step 904, while in step 904 the user may select to view ideas by selecting (e.g., clicking on) a link for viewing ideas. If the user selects to view ideas, method 900 proceeds to step 914, and if not already being displayed on user system 12 (FIGS. 1A, 1B, and 2), a webpage is retrieved via web server 704 (FIG. 7) and displayed on user system 12 showing ideas that were posted in the order in which the ideas are ranked. If this webpage was already being displayed, then which webpage is displayed does not change, and the webpage having the ranked ideas continues to be displayed. Next, method 900 proceeds to step 904 and waits for the next selection.

Similarly, returning to step 904, while in step 904 the user may select to view popular ideas by selecting (e.g., clicking on) a link for viewing recently posted ideas. If the user selects to view popular ideas, method 900 proceeds to step 916. At step 916, if not already being displayed on user system 12 (FIGS. 1A, 1B, and 2), a webpage is retrieved, via web server 704 (FIG. 7), that shows popular ideas that were posted in the order in which the popular ideas are ranked with respect to one another, and then the webpage that was retrieved is displayed. If this webpage was already being displayed, then the webpage that is being displayed does not change, and the webpage having the ranked, recently posted ideas continues to be displayed. Next method 900 proceeds to step 904 and waits for the next selection.

Similarly, returning to step 904, while in step 904 the user may select to view popular ideas by selecting (e.g., clicking on) a link for viewing popular ideas. If the user selects to view popular ideas, method 900 proceeds to step 918, and if not already being displayed on user system 12 (FIGS. 1A, 1B, and 2), a webpage is retrieved via web server 704 (FIG. 7) and displayed on user system 12 showing popular ideas that were posted in the order in which the popular ideas are ranked with respect to one another. If this webpage was already being displayed, then the webpage that is being displayed does not change, and the webpage having the ranked, popular ideas continues to be displayed. Next method 900 proceeds to step 904 and waits for the next selection.

Similarly, returning to step 904, while in step 904 the user may select to view comments related to an idea currently being displayed. If the user selects to view comments, method 900 proceeds to step 920, and if not already being displayed on user system 12 (FIGS. 1A, 1B, and 2), a webpage is retrieved via web server 704 (FIG. 7) and displayed on user system 12 showing comments related to a current idea. If this webpage was already being displayed, then the webpage that is being displayed does not change, and the webpage having the related comments continues to be displayed. Next, method 900 proceeds to step 904 and waits for the next selection.

Returning to step 904, the user may choose to end the session. The session may be ended by closing the current webpage of one of websites 400 (FIG. 4). The current webpage may be closed by requesting to view another webpage, such as by selecting a link that downloads another webpage. If the prior webpage viewed was not part of the website, the back button may cause the downloading of a webpage that is not part of the website, thereby ending the session and implementing step 921 (after implementing step 921, method 900 does not return to step 904, because method 900 has terminated).

Returning to step 908, if as part of logging in, the user is granted access, method 900 proceeds to step 922. While in step 922, user system 12 and web server 704 (FIG. 7) wait to receive the next selection (similar to step 904). All of the options available while in step 904 are also available while in step 922. Similar to when method 900 is in step 904, if while in step 922 a selection is made to end the session, method 900 proceeds to step 921, method 900 terminates and method 900 does not return to step 904 or 922. Also, if while in step 922, a selection is made to logoff, such as by selecting a link for initiating a logoff process, method 900 proceeds to step 923, where a logout is implemented. In an embodiment, only registered users are able to log into websites 400. In another embodiment, in addition to registered user being able to login, a user may be granted guest status, and a user with guest status is granted the same level of access as a registered user. Consequently, a user with guest status can access any of the options available after step 923 is implemented in an alternative embodiment, a user with guest status has many but not all of the privileges of a registered user.

After implementing the logout of step 923, method 900 returns to step 904, and the options that are available to be selected are the same as prior to implementing step 908 and logging in. However, if an operation is implemented as a result of making another selection while in step 922, after the operation is complete, method 900 returns to step 922 instead of returning to step 904. Although while in step 922, a selection may be made for implementing steps 906, 910, 912, 914, 916, 918, and 920, these steps were discussed above, and their description is the same (except that when steps 906, 910, 912, 914, 916, 918, and 920 are entered from step 922 the return is to step 922 instead of 904), and therefore steps 906, 910, 912, 914, 916, 918, and 920 are not discussed here.

Returning to step 922, while in step 922 the user may select to post an idea by selecting (e.g., clicking on) a link for posting an idea. If the user selects to post an idea, method 900 proceeds to step 924, where one or more web pages are presented on user system 12 (FIGS. 1A, 1B, and 2) that facilitate entering an idea that will later be displayed on one of websites 400 (FIG. 4) to other users. Next, after posting the idea in step 924, method 900 proceeds to step 922 and waits for the next selection.

Returning to step 922, while in step 922 the user may select to post a comment on an idea currently being displayed by selecting (e.g., clicking on) a link for posting a comment. If the user selects to post a comment, method 900 proceeds to step 926, where one or more web pages are presented on user system 12 (FIGS. 1A, 1B, and 2) that facilitate posting a comment that will later be displayed on one of websites 400 (FIG. 4) to other users. Next, after posting the comment in step 926, method 900 proceeds to step 922 and waits for the next selection.

Returning to step 922, while in step 922 the user may select to view a watch list to see the status of the ideas (which the user has placed in the user's personal watch list) by selecting (e.g., clicking on) a link for viewing the watch list. If the user selects to view the watch list, method 900 proceeds to step 928, where if the watch list web page was not already downloaded and being displayed, the watch list webpage is downloaded to and displayed on user system 12 (FIGS. 1A, 1B, and 2). The watch list webpage may include ideas, the votes associated with those ideas, and/or comments associated with those ideas that the user has placed in the user's watch list. Next, after viewing the watch list in step 928, method 900 proceeds to step 922 and waits for the next selection. The web page having the watch list may still be present on the screen of user system 12 upon returning to step 922.

Returning to step 922, while in step 922 the user may select to edit the watch list by removing or adding ideas to the watch list. If the user selects to view the watch list, method 900 proceeds to step 930, where one or more web pages are presented that facilitate editing the user's watch list. If the user does not have a watch list, a watch list may be created. In an embodiment, every user is given a watch list, but the watch list is empty until an idea is added to the watch list. In an embodiment, the user must first view the watch list via step 928, and from step 928 the user has an option of implementing step 930 to edit the watch list. Next, after editing the watch list in step 930, method 900 proceeds to step 922 and waits for the next selection.

Returning to step 922, while in step 922 the user may select to vote on an idea by selecting a link for voting. If the user selects to vote on an idea, method 900 proceeds to step 932, where one or more web pages are presented that facilitate voting on a selected idea. After the user enters a vote, user system 12 (FIGS. 1A, 1B, and 2) sends the vote to web server 704 (FIG. 7). Web server 704 records the new vote, computes a new TQMC based on the new vote, and sends the new TQMC back to user system 12 for display on one of websites 400 (FIG. 4). Next, after voting in step 932, method 900 proceeds to step 922 and waits for the next selection.

Returning to step 922, while in step 922 the user may select to view ideas that the user already voted upon. If the user selects to view the user's vote, method 900 proceeds to step 934, where one or more web pages are presented that show the ideas the that the user voted upon and the current TQMC of that idea. Next, after viewing the ideas voted upon in step 934, method 900 proceeds to step 922 and waits for the next selection.

Returning to step 922, while in step 922 the user may select to view ideas that the user already posted. If the user selects to view the user's posted ideas, method 900 proceeds to step 936, where one or more web pages are presented that show the ideas that the user posted, the current TQMC of that idea, and/or comments that others posted that relate to that idea. Next, after viewing the ideas that the user posted in step 936, method 900 proceeds to step 922 and waits for the next selection.

Returning to step 922, while in step 922 the user may select to view ideas that the user already posted comments about. If the user selects to view the ideas that the user commented upon, method 900 proceeds to step 938, where one or more web pages are presented that show the ideas about which the user posted comments, and the current TQMC of that idea, and/or other comments posted about that idea. Next, after viewing the ideas the user posted comments about in step 938, method 900 proceeds to step 922 and waits for the next selection.

Although in FIG. 9 each steps 906-920, and 924-938 are each depicted as a single unit, each step may have several sub-steps, and after each sub-step, method 900 may return to step 904 or 922 and wait for the user to either select the next sub-step of the step selected, to select another of steps 906-920 and/or steps 924-938, or to select another option. In an embodiment, each of the steps of method 900 is a distinct step. In another embodiment, although depicted as distinct steps in FIG. 9, steps 902-938 may not be distinct steps. For example, for all, or nearly all, of the steps of method 900 there are some sub-steps that are performed by user system 12 and others that are performed by web server 704 of FIG. 7 (as will be discussed in FIGS. 10-12, below). In other embodiments, method 900 may not have all of the above steps and/or may have other steps in addition to or instead of those listed above. The steps of method 900 may be performed in another order. Subsets of the steps listed above as part of method 900 may be used to form their own method.

Client-Side Voting Method

FIG. 10 is a method implemented by user system 12 (FIGS. 1A, 1B, and 2) as part of step 932, which is the algorithm represented by the block vote 406 (FIG. 4). In step 1001, user system 1001 receives a webpage having at least one link for casting a vote (a voting link). The link for voting may be received in conjunction with a webpage having a plurality of sections in which each section has at least one aspect of a topic related to the website and the link for voting. On the webpage received, the link for voting may be associated with a posted idea. In step 1002, user system 12 receives a selection of a link for increasing the vote associated with an idea. Step 1002 may involve the user inputting the selection into user system 12. In step 1004, user system 12 sends a request to web server 704 to record the new vote and to re-compute the TQMC based on the addition of the new vote to the TQMC. In step 1006, user system 12 receives information for updating the current web page from web server 704 (FIG. 7); so that the updated webpage shows the new TQMC. Step 1006 may involve receiving a webpage having the same content as the webpage prior to voting except the values of the TQMCs are changed. Additionally, the content may be rearranged in a different order as a result of rearranging the content based on the new TQMCs. In step 1008, an updated webpage is rendered by client application and displayed on user system 12. In an embodiment, each of the steps of method 1000 is a distinct step. In another embodiment, although depicted as distinct steps in FIG. 10, steps 1002-1008 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Server-Side Voting Method

FIG. 11 is an example of a method implemented by web sever 704 (FIG. 7) as part of step 932, which is also part of the algorithm represented by the block vote 406 (FIG. 4). In step 1101, web server 704 sends a webpage to user system 12 (FIGS. 1A-2). The webpage may include a plurality of sections. Each section may include at least one aspect of a topic related to the website and an option for casting a vote for a topic that was posted. In step 1102, web server 704 receives a request for adding a vote to a TQMC associated with an idea. For example, web server 704 may receive a vote that for updating one or more QMCs that are for the same and/or different posted ideas. In step 1103, the weighting of the vote is determined. Step 1103 may involve retrieving one or more weights from tenant data 114 (FIG. 2) and/or web database 708, which may include the time dependent weight. The weights may also be related to the user casting the vote and/or a variety of other factors.

In step 1104, web server 704 computes the new TQMC. Step 1104 may involve determining one or more weighting factors that are multiplied by the vote. The weighting factors may depend on the user placing the vote. For example, votes from customers that bring more revenue may have more weight. Determining the weight may involve computing a time dependent value from web database 708, which is used for a weighting factor. The value retrieved may be a number greater than one, and may be increased to a larger number as the time from the last normalization increases. Step 1104 may involve first computing one or more QMCs by weighting the new votes and adding them to old QMC. Then the QMCs may be used to compute the TQMC. In step 1106, web server 704 determines and forms the changes that need to be made to the current webpage. Step 1106 may involve updating the rankings (e.g., the TQMC values displayed) that are associated with each idea and rearranging the content of the webpage based on the new rankings (e.g., the new TQMCs). The rearranging may involve listing the ideas in a different order. In step 1107, the new ranking and/or TQMC are stored in tenant data 114 (FIG. 2) or web database 708 (FIG. 7). In step 1108 web server 704 sends the changes to the webpage (or the entire revised webpage) to user system 12 (FIGS. 1A, 1B, and 2). In an embodiment, each of the steps of method 1100 is a distinct step. In another embodiment, although depicted as distinct steps in FIG. 11, step 1102-1108 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Method of Carrying Out a Single Client-Server Interaction

Figure 12:
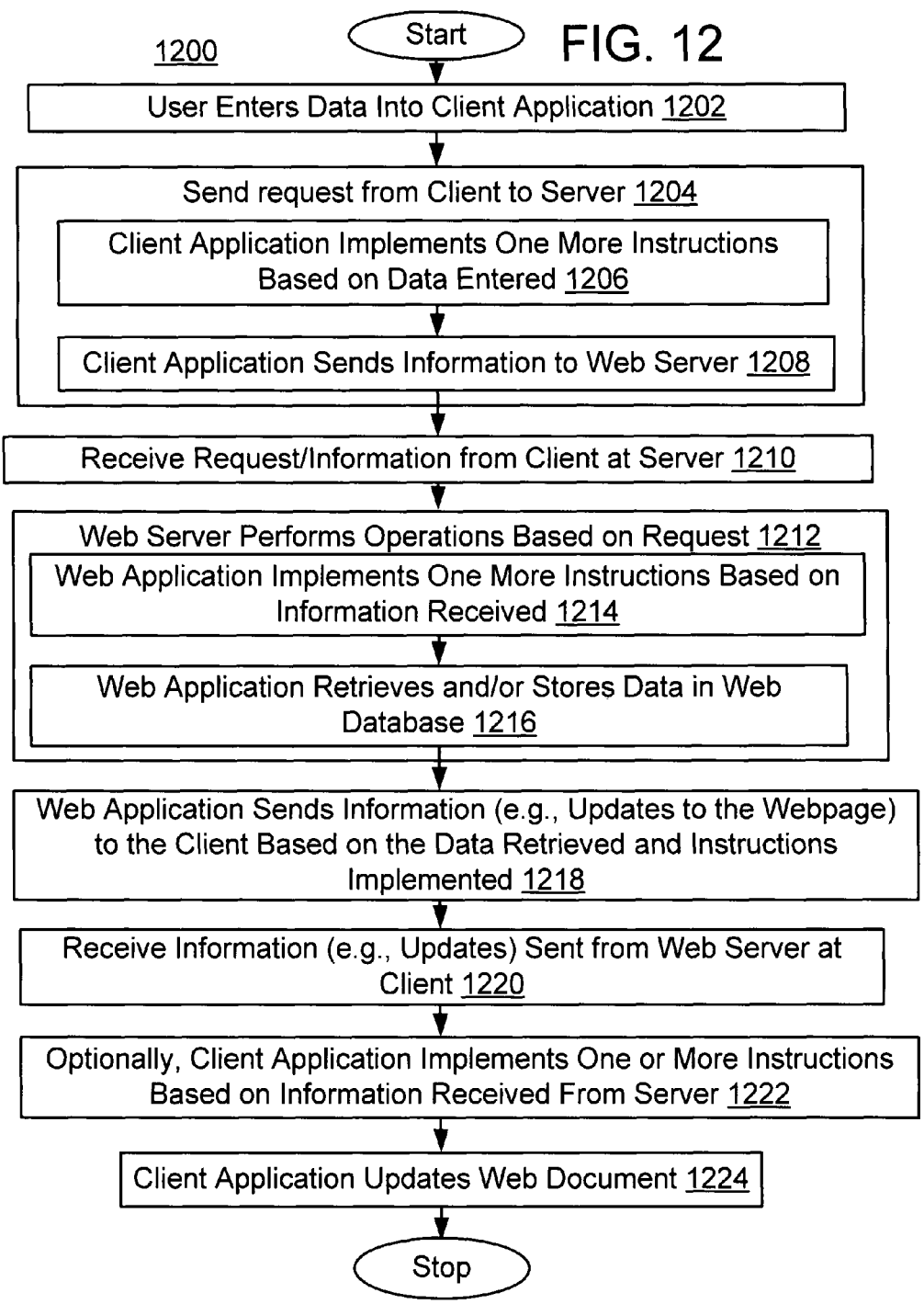
FIG. 12 shows a flowchart of an embodiment of method for a client to interact with a web server.

FIG. 12 shows a flowchart of an embodiment of method 1200 for user system 12 (FIGS. 1A, 1B, and 2) to interact with server side system 702 (FIG. 7) while carrying out methods 900-1100. In step 1202, the user enters data into client application 302 (FIG. 3) based on the content shown in one of websites 400 (FIG. 4). In step 1204, user system 12 sends a request to server 704 for an updated webpage. As an example, step 1204 may involve selecting (e.g., clicking on) a link, such as view recently posted ideas 604 (FIG. 6) or selecting a submit button after entering data into a field, such as the fields of login 404 (FIG. 4). Step 1204 may include two sub-steps, which are steps 1206 and 1208. In step 1206, client application 302 implements one or more instructions based on the information entered by the user. In step 1208, user system 12, via client application 302, sends information to web server 704 (FIG. 7). In step 1210, web server 704 receives the message sent from user system 12.

In step 1212, web server 704 (FIG. 7) performs operations based on the request. Step 1212 may include two sub-steps, step 1214 and 1216. In step 1214, web server 704 performs tasks (e.g., computations) based on the request. In step 1216, web server 704 retrieves data from and/or stores data in web database 708 (FIG. 7) and/or tenant database 22 (FIGS. 1A, 1B, and 2). Steps 1214 and 1216 may be performed prior to during and/or after step 1214, depending on the task being performed. For example, there may be some tasks for which data necessary for performing the task needs to be retrieved prior to performing the task in order to perform the task properly. There may be some sub-tasks that are necessary to perform to produce the data required by a task, and there may be some tasks that need data from web database 708 and/or tenant database 22 as input and produce other data as output that needs to be stored in web database 708 and/or tenant database 22.

In step 1218, based on the operations of step 1212, information, such as updates to webpages of one of websites 400 (FIG. 4) is sent from web server 704 (FIG. 7) to user system 12 (FIGS. 1A, 1B, and 2). In step 1220, the information sent by web server 704 is received at user system 12. In optional step 1222, if performed, one or more instructions are implemented by user system 12 as a result of receiving the information from web server 704. The one or more instructions may involve invoking routines that are part of client application 302 (FIG. 3, e.g., part of the browser) or may involve a call to a function that is stored within user system 12. In step 1224, user system 12 updates web document 302, which is the webpage currently being viewed by the user.

In an embodiment, each of the steps of method 1200 is a distinct step. In another embodiment, although depicted as distinct steps in FIG. 12, step 1202-1224 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method. For example, steps 1202, 1204, 1206, 1220, 1222, and 1224 form a method that is performed on user system 12, while steps 1208-1218 form a method performed by web server 704. The method of steps 1202-1206 and 1220-1224 corresponds to and is more detailed than the method of FIG. 10. However, the method of FIG. 10 is specific to the process of voting, while the method of steps 1202-1206 and 1220-1224 apply to the user system while implementing any of the steps of FIG. 9. Similarly, the method of steps 1208-1218 corresponds to and is more detailed than the method of FIG. 11. However, the method of FIG. 11 is specific to the process of voting, while the method of steps 1208-1218 applies to the server system while implementing any of the steps of FIG. 9.

Method of Computing/Adjusting Rankings

Figure 13:
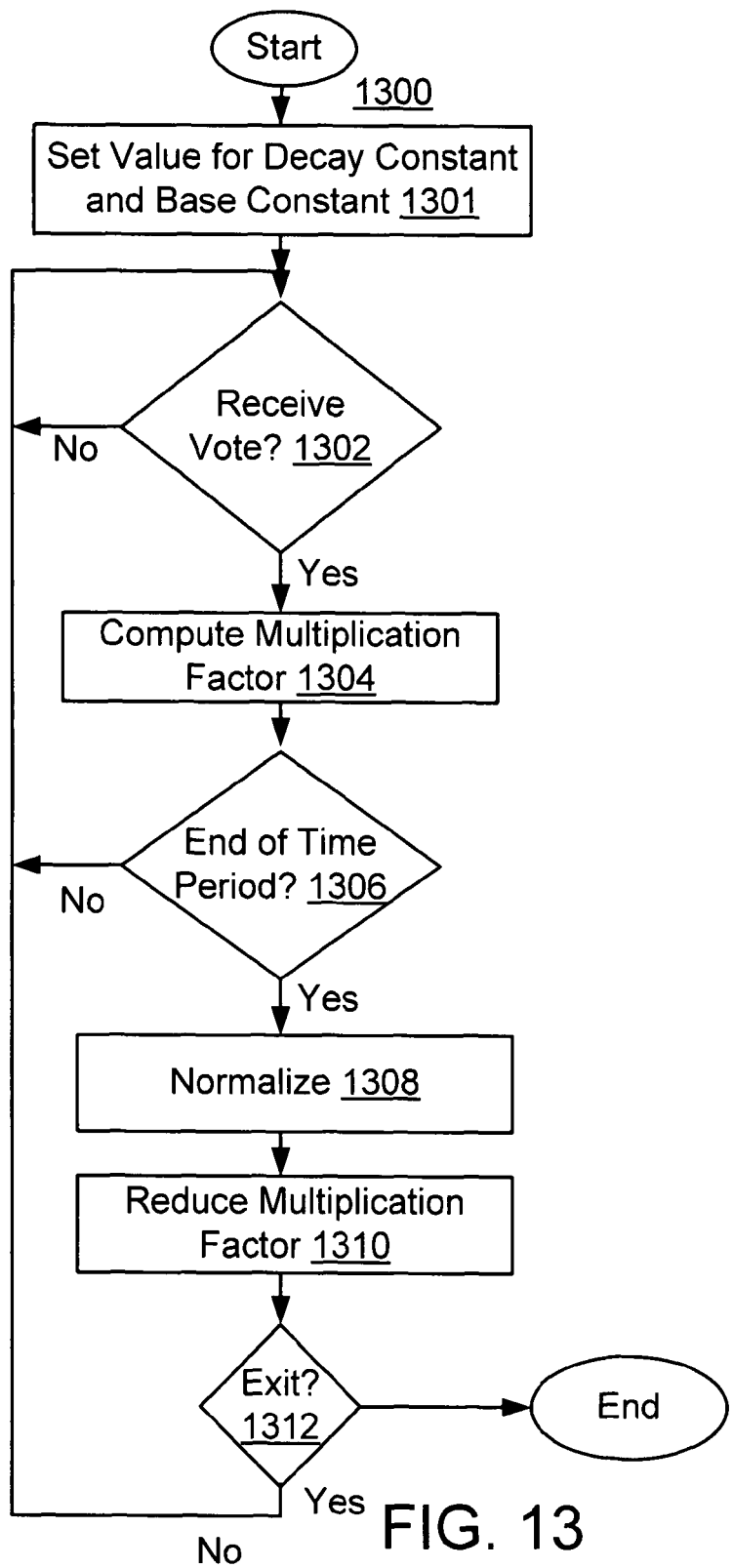
FIG. 13 shows a flowchart of an example of a method, implemented by the web application of FIG. 7, that determines the value of the multiplicative factor by which new votes are multiplied.

FIG. 13 shows a flowchart of an example of a method 1300, implemented by web application 706 (FIG. 7), which determines the value of the multiplicative factor by which new votes are multiplied. Method 1300 may be an embodiment of time dependent weight algorithm 806 (described in FIG. 8). In step 1301, a decay constant, λ, and a base constant C are set to desired values and stored. In step 1302, a determination is made whether a vote was received. If vote was not received, method 1300 returns and repeats step 1302. If a vote was received, method 1300 proceeds to step 1304 where a multiplicative weight factor is computed based on the time passed from the last normalization, the decay constant, and the base. For example, the multiplicative factor is increased according to an exploding exponential that depends on the time elapsed since the last normalization. In other words, $w(t_{i+1})=A_{i+1}C^{t/\lambda}$, where $A_{i+1}$ is the weighting that depends of factors other than time for the current vote, t is the time from the last normalization $t_N$ until now $t_{i+1}(t=t_{i+1}-t_N)$, λ is a decay constant related to the half life, and C is a positive constant. Next, the new TQMC is computed $R(t_{i+1})=w(t_{i+1})+R(t_i)=A_{i+1}C^{t/\lambda}+R(t_i)$, as explained in conjunction with time dependent weight algorithm 806 of FIG. 8. After step 1304, method 1300 proceeds to step 1306 to determine whether a set time period has passed. If the set time period has not passed, method 1300 returns to step 1302. If the second time period has passed, method 1300 proceeds to step 1308, where all of the votes are divided by a large number (or multiplied by a small number) to normalize the votes and prevent an overflow error. Next, in step 1310, the first multiplicative factor is set to a lower value. For example, the first multiplicative factor may be set to its initial value. After step 1310, method 1300 proceeds to optional step 1312 (if present) where a determination is made whether to end method 1300 (e.g., to repair web server 704). After step 1310 or after step 1312 (if present), method 1300 returns to step 1302.

In an embodiment, each of the steps of method 1300 is a distinct step. In another embodiment, although depicted as distinct steps in FIG. 13, step 1302-1312 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Screen Shot of an Embodiment of the Website

Figure 14:
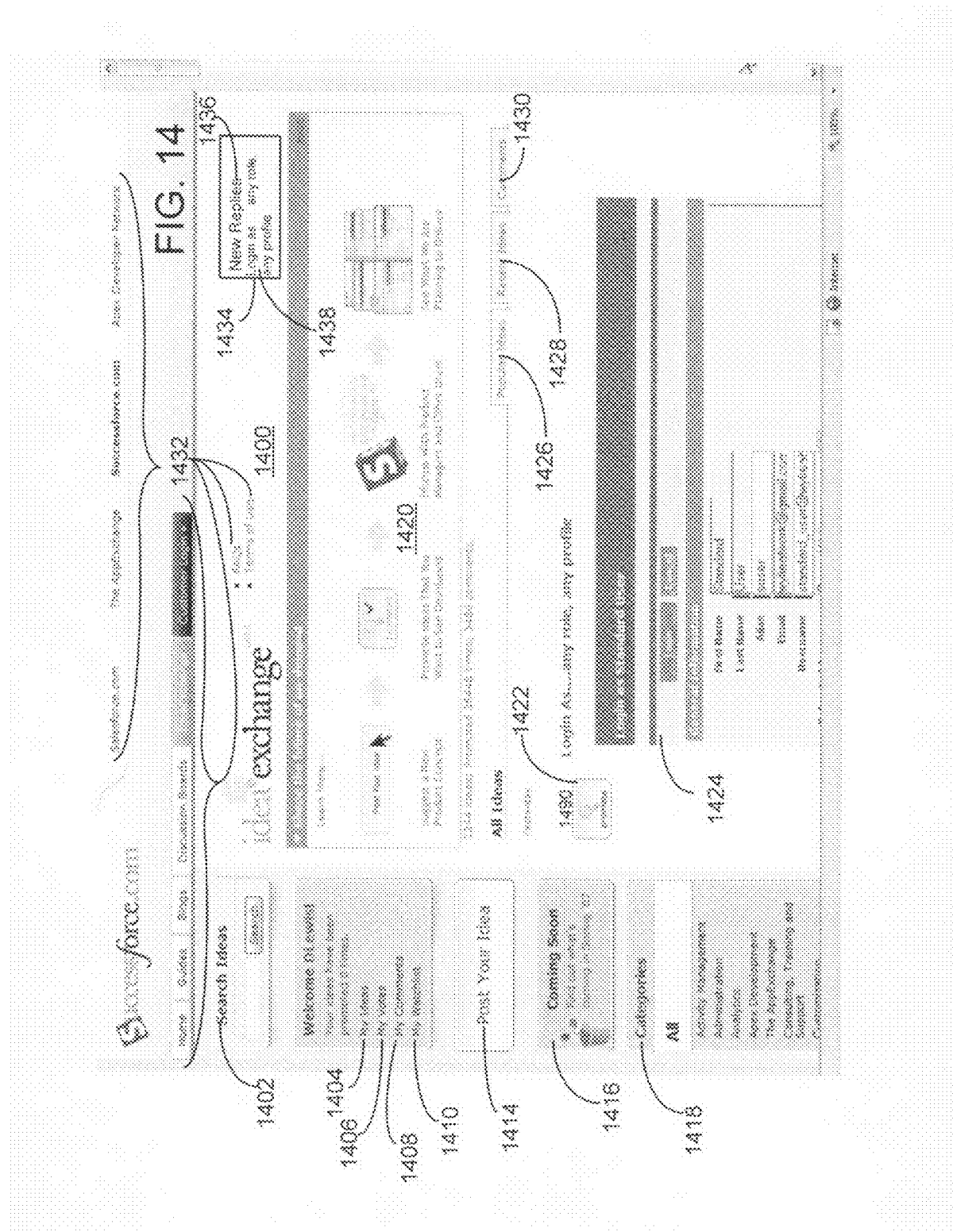
FIG. 14 shows a screenshot of an embodiment of a webpage from the website of FIG. 4.

FIG. 14 shows a screenshot 1400 of an embodiment of a webpage from one of websites 400 (FIG. 4). Screen shot 1400 includes search 1402, my ideas 1404, my votes 1406, my comments 1408, watch list 1410, post your ideas 1414, coming soon 1416, categories 1418, instructions 1420, vote 1422, idea 1424, popular ideas 1426, recent ideas 1428, comments 1430, other links 1432, and message thread 1434 having message thread header 1436 and message snippet. In other embodiments, screen shot 1400 may not have all of the elements listed and/or may have other elements instead of or in addition to those listed.

The links search 1402, my ideas 1404, my votes 1406, my comments 1408, watch list 1410, post your ideas 1414, vote 1422, popular ideas 1426, recent ideas 1428 and comments 1430 of screen shot 1400 cause the implementation of search 403 (FIG. 4) via the search step 912, view my ideas 608 (FIG. 6) via the my ideas step 936, view my votes 614 via the my vote step 934, view my comments 612 via the view my comments step 938, post ideas 408 (FIG. 4) via the post an idea step 924, vote 406 (FIG. 4) via the vote step 932, view popular ideas 606 (FIG. 6) via the popular ideas step 918, view recently posted ideas 604 (FIG. 6) via the recent ideas step 916, view comments 610 (FIG. 6) via the view comment step 920, respectively, which were described above in conjunction with FIGS. 4, 6, and 9. Similarly, the link watch list 1410 of screen shot 1400 causes the implementation of watch list 412 via the view watch list step 928 and the edit watch list step 930, which were described in FIGS. 4 and 9, respectively. The link coming soon 1416 of screen shot 1400 cause the implementation of the coming soon step 910, which is described in FIG. 9. The link categories 1418 of screen shot 1400 cause the implementation of categories 616 via the categories step 906, which were described in FIGS. 6 and 9, respectively.

Instructions 1420 include static information related to how to vote. Idea 1424 is an example of a posted idea. Other links 1432 show some examples of other links that may appear on one of websites 400, such as a link for frequently asked questions, a link for words of use, and/or links to related websites.

Message thread 1434 provides the user with an alert when a message thread that the user commented on has been updated with another comment. Message thread 1434 may appear when the user logs on. In an embodiment, if the user is a guest, when the user visits webpage 1400, the user receives message thread 1434. In an embodiment, a browser-based cookie is sent to the guest's system for handling the guest's message thread. The message thread 1434 allows the user to remain engaged with other users, since it's often hard for a user to remember to go back and read responses to a discussion to which the user contributed. By having message thread 1434 appear when the user revisits the site, the user can restart or continue a conversation where the user left off. In the embodiment shown in FIG. 14 the text of message thread header is "New Replies." In another embodiment a different title conveying the same message or a similar message may be used instead. Message thread header 1436 is heading that identifies the box that contains a link to the message thread. Message snippet 1438 is a snippet of a comment made by the last person to add a comment about the idea that is being watched. Message snippet 1438 may also be a link to the corresponding comment in the message thread.

Method for Using the Environment (FIGS. 1A, 1B, and 2)

Figure 15A:
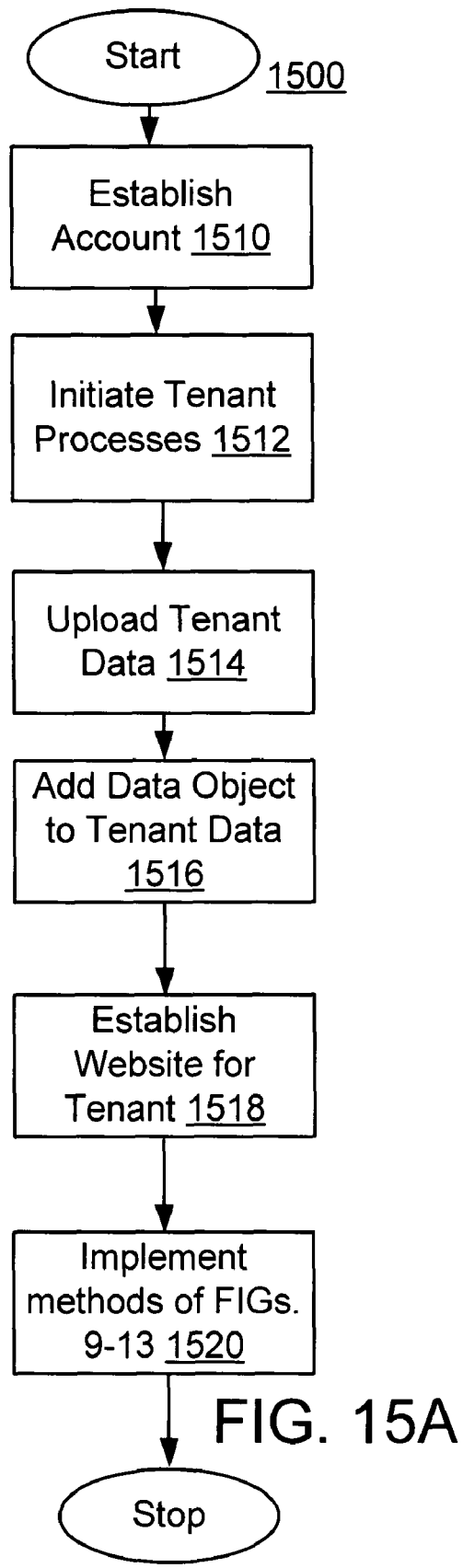
FIG. 15A shows a flowchart of an example of a method of using the environment of FIG. 1A.

FIG. 15A shows a flowchart of an example of a method 1500 of using environment 10. In step 1510, user system 12 (FIGS. 1A, 1B, and 2) establishes an account. In step 1512, one more tenant process space 104 (FIG. 2) are initiated on behalf of user system 12, which may also involve setting aside space in tenant space 112 (FIG. 2) and tenant data 114 (FIG. 2) for user system 12. Step 1512 may also involve modifying application metadata to accommodate user system 12. In step 1514, user system 12 uploads data. In step 1516, one or more data objects are added to tenant data 114 where the data uploaded is stored. In step 1518, a website is established for the new tenant, which may include storing information in web database 708, for creating web pages associated with one of websites 400 for the tenant. In step 1520 any of the methods of FIGS. 9-13 may be carried out. In an embodiment, each of the steps of method 1500 is a distinct step. In another embodiment, although depicted as distinct steps in FIG. 15A, step 1510-1520 may not be distinct steps. In other embodiments, method 1500 may not have all of the above steps and/or may have other steps in addition to or instead of those listed above. The steps of method 1500 may be performed in another order. Subsets of the steps listed above as part of method 1500 may be used to form their own method.

FIG. 15B is a flowchart of an example of a server-side method 1518.1 for implementing step 1518 of FIG. 15A. The steps of method 1518.1 are an embodiment of the sub-steps of step 1518 that may be implemented by the server. After step 1516 of FIG. 15A, on the server side, method 1500 proceeds to step 1522 (which is an embodiment of sub-step of step 1518).

In step 1522, web server 704 receives a request to set up a website for a particular tenant. In step 1524, web server 704 sends instructions to system 16, which sets up a database for the website.

In step 1526, web server 704 sends a request for information necessary to create the website and/or the tenant. In an embodiment, the information for setting up the website may be derived from tenant data 114 (FIG. 2) so that the amount of data that the tenant needs to enter is less than were information not taken from tenant data 114.

In step 1528, the data requested is received from system 16 and/or from the tenant. In step 1530, a container is created in web database 706 to store the information received. In step 1532, administrative tools and/or tools for setting up the website are sent to the tenant. In step 1534, web server 704 receives a choice of the desired level service. In step 1535, if the tenant has an appropriate level and chooses a domain name, the choice of a domain name is received at server 704. In step 1536, one of websites 400 is set up for the tenant that requested the website.

In step 1538, if the tenant's level of service allows for multiple levels of access, information is received related to the level of access that will be granted to each user and/or each type of user. In an embodiment, the information may be retrieved from tenant data 114 (FIG. 2) based on the roles assigned to different members of the tenant's organization in order to reduce the amount of information that the tenant needs to provide while having one of websites 400 configured (e.g., set up). In other words, users having different roles may be granted different levels of access. For example, one level of access may allow the removal of posts by other people. Some examples, of roles assigned to different members of the tenants organization may be web administrator, sales representative, engineer, CEO, etc. In an embodiment, the tenant may assign different roles to different customers of the tenant and/or potential customers. For example, one role may be a guest and another role may be a customer, and each of these roles may have different degrees of access to one of websites 400. For example, at one level of access (e.g., the customer level) the user may be able to save ideas that the user is considering whether to post, but that have not yet been posted, while at another level (e.g., the guest level) the user may not be able to save ideas.

In step 1540, web server 704 sends a request to system 16 to setup the levels of access and the levels of access are set up. In step 1542, if desired, the language tool is applied to one of websites 400 to translate the website into the desired language. Additionally, if desired and if the tenant selected an appropriate level of service, at the tenant's request, certain words on the initial website may be substituted with other words to give the tenant some control over the look and feel of the website. For example, at the tenant's request the word idea may be replaced with the word "article" throughout the entirety of one of websites 400. Additionally, if desired and if the tenant selected an appropriate level of service, at the tenant's request, specific occurrences of specific static text may be modified. For example, various headings of different sections may be modified. As part of step 1542, other tasks may be performed to establish a theme and/or modify the language of one of websites 400. Step 1542 may involve the sending of many messages between the tenant web server 704 and/or system 16. Web server 704 may send many revised versions of one of websites 400 to the tenant, and the tenant may, via administrative tools, make many requests for further modifications to one of websites 400 in response to the viewing the revised versions of one of websites 400.

In step 1544, system 16 integrates one of websites 400 with another website of the tenant. After step 1544, on the server side, method 1500 continues with step 1520.

In an embodiment, each of the steps of method 1518.1 is a distinct step. In another embodiment, although depicted as distinct steps in FIG. 15B, step 1522-1544 may not be distinct steps. In other embodiments, method 1518.1 may not have all of the above steps and/or may have other steps in addition to or instead of those listed above. The steps of method 1518.1 may be performed in another order. Subsets of the steps listed above as part of method 1518.1 may be used to form their own method.

FIG. 15C is a flowchart of an example of a client-side method 1518.2 for implementing step 1518 of FIG. 15A. The steps of method 1518.2 are the sub-steps of step 1518 that are implemented at the client. After step 1516 of FIG. 15, on the client side, method 1500 proceeds to step 1550 (which is a sub-step of step 1518).

In step 1550, the tenant sends a request for setting up one of websites 400. In step 1552, the tenant receives a request for information for setting up one of websites 400. Alternatively or additionally, the information may be automatically retrieved from tenant data 114 (FIG. 2).

In step 1554, depending on the embodiment and the level of service, the information requested is sent. In step 1556, the tenant receives tools for configuring one of websites 400 and administrative tools, which may include analytical tools 842, download 844, access control 846, and moderation tools 848 (FIG. 8C).

In step 1558, if the tenant has an appropriate level of service, web server 704 sends a choice of a domain name to system 16. In step 1559, the tenant may request a specific domain name. Alternatively, the domain name may be automatically generated based on tenant data 114 (FIG. 2). In step 1560, the tenant receives webpages associated with one of websites 400, which was just created. In step 1561, the tenant may send information regarding different levels of access. Step 1561 may be part of the implementation of access control 846.

In step 1562, a request for translating the website to a different language, replacing specific words with other words, to otherwise customize one of websites 400 may be received. In step 1564, A revised webpage is received. After step 1564, method 1518.2 proceeds to step 1520. In an embodiment, each of the steps of method 1518.2 is a distinct step.

In another embodiment, although depicted as distinct steps in FIG. 15C, step 1550-1564 may not be distinct steps. In other embodiments, method 1518.2 may not have all of the above steps and/or may have other steps in addition to or instead of those listed above. The steps of method 1518.2 may be performed in another order. Subsets of the steps listed above as part of method 1518.2 may be used to form their own method.

Method for Creating the Environment (FIGS. 1A, 1B, and 2)

Figure 16:
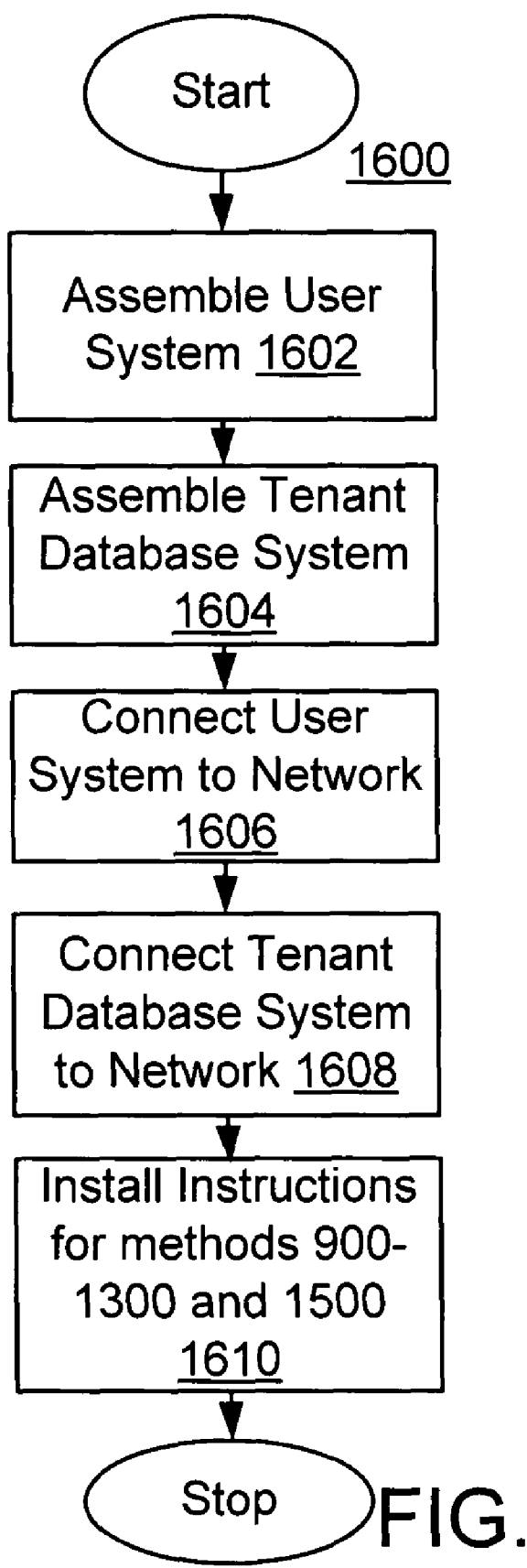
FIG. 16 shows a flowchart of an example of a method of making environment of FIG. 1A.

FIG. 16 is a method of making environment 10, in step 1602, user system 12 (FIGS. 1A, 1B, and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1604, system 16 (FIGS. 1A, 1B, and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 1606, user system 12 is communicatively coupled to network 104. In step 1608, system 16 is communicatively coupled to network 104 allowing user system 12 and system 16 to communicate with one another (FIG. 2). In step 1610, one or more instructions may be installed in system 16 and/or server side system 702 (FIG. 7, e.g., the instructions may be installed on one or more machine readable media, such as computer readable media, therein) and/or system 16 and/or server side system 702 is otherwise configured for performing the steps of methods 900-1518.2 (FIGS. 9-15C, respectively). For example, as part of step 1610, one or more instructions may be entered into the memory of system 16 and/or server side system 702 for acting as a web server that hosts a website for posting ideas. For example, the one or more instructions for the website may include one or more instructions for clients of the tenants to post ideas, post comments, vote, create a watch list, view a watch list, compute the time dependent weights, and an algorithm for computing the TQMC.

Extensions and Alternatives

The sponsoring organization website may have been established prior to the customer feedback site, but could also be established after or concurrently with the customer feedback website. In an embodiment, the integration of the two websites may be established, regardless of when the sponsoring organization website was established.

In an alternative embodiment, none of the user tools of websites 400 (FIG. 4) are available for use without logging in. In yet another embodiment, the tenant may have the option of setting how much of the website is available for use without logging in. In an embodiment, the tenants are given user tools that the clients are not given, such as for setting preferences regarding how to rank ideas, how to weight different types of votes, and preferences regarding the types of advertisers and/or advertisements that are allowed to appear on the website and/or preferences regarding financial arrangements related to the advertisements.

Alternative methods for computing a TQMC may be used instead of the method used above, which may have none, some or all of the properties of multiplying new votes by an exponentially increasing function of time. For example, the votes are added together over a certain time period (e.g., between $t_1$ and $t_2$). After summing the votes over the period of time, an operation O is performed on the sum forming what will be referred to as an operated sum $$R = O\left(\sum_{t_1}^{t_2} v(t_i)\right),$$

where $v(t_i)$ is the vote at time $t_i$, and O is any operation in which the output is smaller than the input. For example, O could be multiplication by a positive number less than 1, the operation of taking a square root, the operation of taking a log, or any of a number of other operations. Next each new vote during the next time period (e.g., between time $t_2$ and $t_3$) is added to the operated sum. At the end of the second time period the same operation is performed to sum of the first operated sum and the new votes, forming a second operated sum $$R = O\left(\sum_{t_2}^{t_3} v(t_i) + O\left(\sum_{t_1}^{t_2} v(t_i)\right)\right).$$

This process is repeated. After repeating n times, one obtains $$R = \sum_{t_{n-1}}^{t_n} v(t_i) + O\left(\sum_{t_{n-3}}^{t_{n-2}} v(t_i) + O\left(\sum_{t_{n-5}}^{t_{n-4}} v(t_i) + O\left(\sum_{t_{n-7}}^{t_{n-6}} v(t_i) + \ldots\right)\right)\right).$$

By first summing the votes over a time period and then operating on the sum or the sum plus the last operated sum, one can avoid performing operations on individual votes. If this sum tends to increase with time, then every so often a normalization is performed to prevent an overflow error. If O is simply multiplication by a number less than 1 (e.g., ½), then the result is an exponential decay of the weight of the older votes. As long as O is a monotonically increasing function of the TQMC no matter how many times the operation is applied to two TQMCs the order of the rankings is preserved and the higher ranking remains the higher ranking. As long as O is a function whose output value is smaller than the input value, the older votes will be decreased in significance by a higher percentage compared with the newer value. Some examples of monotonically increasing functions with smaller outputs than the inputs are multiplication by a positive number between 1 and 0, taking a square root of a TQMC, raising a TQMC to a positive fractional power, taking a logarithm to a base greater than 2, or another monotonically increasing function.

Instead of applying the operator O to the prior TQMC, the operator $(O^{-1})^n$ can be applied to the new votes, where $O^{-1}$ is the inverse of O, where n is the number of times the operator $O^{-1}$ is applied, and n is a number that increases with time. Alternatively, as long as $O^{-1}$ is a monotonically increasing function of time that has an output that is greater than the input, whether or not $O^{-1}$ has an inverse, the operator may be applied to new votes $O^{-1}$. For example, $O^{-1}$ may be raising the vote to a power such as 2, and n may be written as at+k, where a and k and constants, t is the time elapsed from the last normalization $t_N$ to the current time $t_{i+1}$, then a new vote may be given by the value $V(t_{i+1})=(A_i^2)^{at+k}=A_i^{2(at+k)}$. Some examples of monotonically increasing functions are multiplication by a positive number that increases with time, addition of a constant that increases with time, raising a TQMC to a positive power greater than 1 that increases with time, applying n times a logarithm of the to a base greater than 2 (where n is a number that increases with time), or another monotonically increasing function that increases with time.

In an alternative embodiment, instead the weights by which the new votes are multiplied by or the weights by with the prior TQMCs are multiplied by being continuous functions of time, the time may be divided into intervals, and all votes received during the same time interval are given the same weight. For example, the time interval may be one day or one week and any votes received during the same day or week respectively, is given the same weight.

In an embodiment, the manner in which the weighting is increased with time is $w_{i+1}=c*w_i$ (for example, when i=0, the weight may be $w_0=c$), where $w_i$ is the multiplicative factor of the $i^{th}$ time interval since the first time period has elapsed, $w_{i+1}$ is the multiplicative factor used for the $i+1^{st}$ passage of the time period, c is the second multiplicative factor that is multiplied by $w_i$ to increase the first multiplicative factor from $w_i$ to $w_{i+1}$. In an embodiment i is an increasing function of time. In an embodiment, the index i is a linear function of time in another embodiment the index i is not a linear function of time. If $w_{i+1}=c*w_i$, and if the index i is a linear function of time, then the decay in the relative significance of the older votes is exponential. More specifically, if $w_{i+1}=c*w_i$ then $w_{i+k}=(c^k)w_i$ or $w_j=(c^{j-i})w_i$. Consequently, the votes that occurred at a time having weight $w_i$ will have decayed in significance with respect to the votes having the weight $w_j$ by $c^{-(j-i)}$. If the index is a linear function of time then $i=at_i+$ constant and $j=at_j+$constant, and the decay factor has the form of $c^{-a(t_j-t_i)}$.

In yet another embodiment, the tenant is offered a choice of whether to pay a fee for the website and keep the site free of advertisers or whether to allow the advertisers advertise on the website. Tools may be provided that assist the tenant in adding features not provided with the websites 400.

Regarding the integrated login, in an alternative embodiment, during set up, system 16 may send code that is installed on the tenant's other website that calls a login routine associated with one of websites 400 whenever a user attempts to access a secure part of the tenant's website. In an embodiment, integration tools 830 may also provide an integrated site map that appears in both one of websites 400 and another website of the tenant. For example, during set up, system 16 may send code that is installed on the tenant's other website that adds to the site map appearing on the tenant's other website to one or more links to one of websites 400 as additional menu options or along with links to web pages of the tenants other website. Alternatively or additionally, during set up, system 16 may request information identifying the location of the tenant's default page, which is called whenever a user attempts view a page of one of websites 400 that is intended to display a site map. A container may be set up by web server 704 that stores one or more pointers to the tenant's default page and/or other website. Whenever the user accesses either one of websites 400 or the user's other website the same site map is composed from the tenant's site map and links to pages of one of websites 400, so that the user sees the same site map whether the user is viewing the given one of websites 400 that is associated with the tenant or the tenant's other website. Access to one of websites 400 may be controlled by the tenant associated with that website and/or by the provider of the website (e.g., the host of system 16). Access to one of websites 400 may be established based on access authorization to another website and/or system or based on access authorization given to on-demand services associate with system 16. The tenant may control access to one of website 400 via system 16 and/or via another system. The data associated with one of websites 400 may be encrypted.

Language control 826 and theme control 828 also relate to changing the look and feel of one of websites 400. Consequently, in an embodiment, instead of being separate entities, language tools 826 and theme control 828 may be included within integration tools 830 or integration control 830 may be part of theme control 828. In an embodiment, since language control 826 and theme control 828 also relate to changing the look and feel of one of websites 400, language tools 826 and theme control 828 may be included within integration tools 830 or integration control 830 may be part of theme control 828.

Although in the embodiment of FIG. 14, the content is rearranged by changing an order in which ideas in a list of ideas are displayed, the ranking of the ideas may rearrange the webpage in other ways. For example, the rankings of the ideas may determine which the idea is placed in a banner that extends across the top of the webpage or whether an idea is placed in the right or left margin of the webpage. In an embodiment, SQL or other database statements are automatically generated for retrieving the ideas from the database, updating the TQMCs, and sorting the ideas according to the rankings (e.g. to the TQMCs). In another embodiment, other machine instructions carry out the operations performed at web server 704. In an embodiment, the contents of the webpage are rearranged infrequently enough so that the content is unlikely to be significantly rearranged during the same user session or during back-to-back user sessions by the same user. For example, once a day or once every two or three hours, the arrangement of the ideas in the webpage may be changed to new arrangement. As another example, the arrangement of the ideas on the webpage is not changed during a user session or during back-to-back user sessions by the same use. In an alternative embodiment, there is a separate tenant database 708 (FIG. 7) for each tenant, which enhances isolation of user information.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing a web page for posting ideas integrated with an on-demand service, the method comprising:
   receiving, at a host system, at least one vote for at least one of a plurality of ideas that were displayed, by a client machine, to a user, on the webpage for posting ideas;
   determining, by the host system, a weighting for the at least one vote received from the client machine, based at least in part upon information about the user retrieved from the on demand service;
   determining a Total Qualitative Management Criterion (TQMC) for the idea by applying the weighting from the on-demand service to the at least one vote; and
   sending, to the client machine, a display of the webpage having at least one idea ranked based on the TQMC.

2. The method of claim 1, wherein determining a Total Qualitative Management Criteria further includes:
   applying an increasing function of time to newer votes to enable relative weightings of older votes to diminish over time without requiring computing a decaying time function to determine weightings for each vote.

3. The method of claim 1, further comprising providing analytical tools for analyzing a relative desirability of items associated with the ideas.

4. The method of claim 1, further comprising:
   receiving a new idea from a user of the webpage having the ideas; and
   posting the new idea on the webpage.

5. The method of claim 1, further comprising:
   receiving a request from a system of a sponsor of the webpage to remove at least one idea of the plurality of ideas; and
   in response, removing the at least one idea.

6. The method of claim 1, further comprising:
   receiving a request to replace multiple occurrences of a word on the webpage with another word or phrase; and
   in response, replacing the multiple occurrences of the word.

7. The method of claim 1, further comprising:
   receiving a request for locating the webpage at a particular domain name; and
   in response, locating the webpage at a pre-established URL having that domain name.

8. The method of claim 1, further comprising:
   sending to a user of the webpage, tools for reporting to a system of a sponsor of the webpage abuse of the webpage.

9. The method of claim 1, further comprising:
   sending tools from a provider of the webpage to a system of a sponsor of the webpage for moderating content on the webpage.

10. The method of claim 1, the webpage being part of a first website provided by a first website providing entity, the method further comprising:
    receiving a request from a user to access a part of the webpage that requires logging in;
    determining that the user is not logged in; and
    sending to the user a login request that is associated with a second website.

11. The method of claim 1, the webpage being part of a first website provided by the host system, which is a host system of a first website providing entity, the method further comprising:
    receiving, at the host system of the first website providing entity, information about a second website, which is associated with a host system of a sponsor of the first website; and
    configuring a process running on the first host system that is associated with the first website to call a login process that is also called by a process running on the host system of the second website.

12. The method of claim 1, the host system being a host system of a provider of the webpage, the method further comprising sending administrative tools from a provider of the webpage to a system of a sponsor of the webpage.

13. The method of claim 12, the administrative tools including one or more instructions for controlling access to the webpage.

14. The method of claim 12, the administrative tools including one or more instructions for controlling an appearance of the webpage.

15. The method of claim 1, the webpage being part of a first website provided by the host system, which is a host system of a first website providing entity, the method further comprising:
    receiving, at the host system of the first website providing entity, a request for locating the webpage at a particular domain name;
    in response to the request for locating, locating the webpage at a pre-established URL having that domain name;

receiving a new idea from a user of the webpage;
posting the new idea on the webpage;
in response to one or more requests received from a system of a sponsor of the first website, analyzing a plurality of sections of the webpage for information indicating a relative desirability of features of products associated with the plurality ideas;
receiving a request, via tools for moderating content of the first website, from the system of a sponsor of the website to remove at least one idea of the plurality of the ideas;
in response to receiving the request via the tools for moderating, removing the at least one idea;
receiving, at the host system of the first website providing entity from the system of the sponsor, a request to replace multiple occurrences of a word on the webpage with another word or phrase;
in response to the request to replace, replacing the multiple occurrences of the word;
receiving, at the host system of the provider of the first website from the client machine, via tools for reporting abuse, a report of an abuse of the webpage;
receiving, at the host system of the provider of the first website, a request from a user to access a part of the webpage that requires users to be logged in;
determining that the user is not logged in; and
sending, to a webserver system associated with the sponsor, a login request that is associated with a second website, the login request being for the user.

16. The method of claim 1, the webpage being part of a first website provided by the host system, which is a host system of a first website providing entity, the method further comprising:
sending, to a sponsor's system, tools to report abuse of the first website with the first website, the sponsor being a sponsor of the first webpage that is provided by the first webpage providing entity;
receiving at the host system of the first website providing entity from the sponsor's system, a request for a choice of a level of service;
sending from the host system, which is associated with a provider of the webpage, administrative tools from the host system of the first webpage providing entity to the system of the sponsor of the webpage;
the administrative tools including at least
one or more links for invoking one or more tasks for controlling access to the webpage, if consistent with the choice of the level of service;
one or more links for invoking one or more tasks for controlling an appearance of the webpage, if consistent with the choice of the level of service;
one or more links for invoking one or more tasks for moderating user interactions, if consistent with the choice of the level of service;
one or more links for invoking one or more tasks for translating text on the webpage from one language to another, if consistent with the choice of the level of service;
one or more links for invoking one or more tasks for causing the first website to appear as part of the second website, if consistent with the choice of the level of service;
one or more links for invoking one or more tasks that cause the first website to invoke a login that is invoked by the second website, if consistent with the choice of the level of service;
one or more links for invoking one or more tasks for analyzing postings on the webpage to determine modifications of one or more products, if consistent with the choice of the level of service; and
one or more links for invoking one or more tasks for downloading data extracted from the postings on the webpage, if consistent with the choice of the level of service.

17. The method of claim 1, the determining of the weighting includes at least retrieving information from a source other than the on-demand service.

18. A method for providing a webpage for posting ideas integrated with on-demand customer relationship management, the method comprising:
receiving a webpage at a client machine from a tenant area of a multi-tenant database system, the client machine including at least a monitor, a processor system for implementing the method, a storage system having at least one or more machine readable media storing thereon one or more instructions, one or more instructions for communicating with the server; the receiving of the webpage includes the processor system accessing the storage system and implementing the one or more instructions,
the webpage for posting ideas including at least a plurality of ideas;
sending from the client machine at least one vote for at least one of the plurality of ideas;
receiving from the multi-tenant database system revisions of the webpage including at least an updated vote; and
displaying by the client machine, the webpage having the at least one idea ranked based on a Total Quality Management Criterion (TQMC) that is based on the vote and on a weighting of the vote.

19. A machine readable medium storing one or more machine instructions for a method comprising:
receiving at a host system, at least one vote for at least one of a plurality of ideas that were displayed, by a client machine, to a user on the webpage for posting ideas;
determining, by the host system, a weighting for the at least one vote received from the client machine, based at least in part upon information about the user retrieved from the on demand service;
determining a Total Qualitative Management Criterion (TQMC) for the idea by applying the weighting from the on-demand service to the at least one vote; and
sending, to the client machine, a display of the webpage having at least one idea ranked based on the TQMC.

20. The machine readable medium of claim 19, wherein determining a Total Qualitative Management Criteria further includes:
applying an increasing function of time to newer votes to enable relative weightings of older votes to diminish over time without requiring computing a decaying time function to determine weightings for each vote.

21. The machine readable medium of claim 19, the method further comprising providing analytical tools for analyzing a relative desirability of items associated with the ideas.

22. The machine readable medium of claim 19, the method further comprising:
receiving a new idea from a user of the webpage having the ideas; and
posting the new idea on the webpage.

23. The machine readable medium of claim 19, the method further comprising:
receiving a request from a system of a sponsor of the webpage to remove at least one idea of the plurality of ideas; and
in response removing the at least one idea.

24. The machine readable medium of claim 19, the method further comprising:
receiving a request to replace multiple occurrences of a word on the webpage with another word or phrase; and
in response replacing the multiple occurrences of the word.

25. The machine readable medium of claim 19, the method further comprising:
receiving a request for locating a webpage at a particular domain name; and
in response locating the webpage at a pre-established URL having that domain name.

26. The machine readable medium of claim 19, the method further comprising:
sending to a user of the webpage, tools for reporting to a system of a sponsor of the webpage abuse of the webpage.

27. The machine readable medium of claim 19, the method further comprising sending tools from a provider of the webpage to a system of a sponsor of the webpage for moderating content on the webpage.

28. The machine readable medium of claim 19, the webpage being part of a first website provided by a first website providing entity, the method further comprising:
receiving a request from a user to access a part of the webpage that requires logging in;
determining that the user is not logged in; and
sending to the user a login request that is associated with a second website.

29. The machine readable medium of claim 19, the webpage being part of a first website provided by the host system, which is a host system of a first website providing entity, the method further comprising
receiving at the host system of the first website providing entity, information about a second website, which is associated with a host system of a sponsor of the first website; and
configuring a process running on the first host system that is associated with the first website to call a login process that is also called by a process running on the host system of the second website.

30. The machine readable medium of claim 19, the host system being a host system of a provider of the webpage, the method further comprising sending administrative tools from a provider of the webpage to a system of a sponsor of the webpage.

31. The machine readable medium of claim 30, the administrative tools including one or more instructions for controlling access to the webpage.

32. The machine readable medium of claim 30, the administrative tools including one or more instructions for controlling an appearance of the webpage.

33. The machine readable medium of claim 19, the webpage being part of a first website provided by the host system, which is a host system of a first website providing entity, the method further comprising:
receiving at the host system of the first website providing entity a request for locating the webpage at a particular domain name;
in response to the request for locating, locating the webpage at a pre-established URL having that domain name;
receiving a new idea from a user of the webpage;
posting the new idea on the webpage;
in response to one or more requests received from a system of a sponsor of the first website, analyzing the plurality of sections for information indicating a relative desirability of features of products associated with the plurality ideas;
receiving a request, via tools for moderating content of the first website, from the system of the sponsor of the website to remove at least one idea of the plurality of the ideas;
in response to receiving the request via the tools for moderating, removing the at least one idea;
receiving at the host system of the first website providing entity from the sponsor's system, a request to replace multiple occurrences of a word on the webpage with another word or phrase;
in response to the request to replace, replacing the multiple occurrences of the word;
receiving, at the host system of the provider of the first website from the client machine, via tools for reporting abuse, a report of an abuse of the webpage;
receiving, at the host system of the provider of the first website, a request from a user to access a part of the webpage that requires users to be logged in;
determining that the user is not logged in; and
sending to a webserver system associated with the sponsor, a login request that is associated with a second website, the login request being for the user.

34. The machine readable medium of claim 19, the webpage being part of a first website provided by the host system which is a host system of a first website providing entity, the method further comprising:
sending to a sponsor's system, tools to report abuse of the first website by the first website, the sponsor being a sponsor of the first webpage that is provided by the first webpage providing entity;
receiving at the host system of the first website providing entity from the sponsor's system, a request for choice of a level of service;
sending from the host system, which is associated with a provider of the webpage, administrative tools from the host system of the first webpage providing entity to the system of the sponsor of the webpage;
the administrative tools including at least
one or more links for invoking one or more tasks for controlling access to the webpage, if consistent with the choice of the level of service;
one or more links for invoking one or more tasks for controlling an appearance of the webpage, if consistent with the choice of the level of service;
one or more links for invoking one or more tasks for moderating user interactions, if consistent with the choice of the level of service;
one or more links for invoking one or more tasks for translating text on the webpage from one language to another, if consistent with the choice of the level of service;
one or more links for invoking one or more tasks for causing the first website to appear as part of the second website, if consistent with the choice of the level of service;
one or more links for invoking one or more tasks that cause the first website to invoke a login that is invoked by the second website, if consistent with the choice of the level of service;
one or more links for invoking one or more tasks for analyzing postings on the webpage to determine modifications of one or more products, if consistent with the choice of the level of service; and one or more links for invoking one or more tasks for downloading data extracted from the postings on the webpage, if consistent with the choice of the level of service.

35. The machine readable medium of claim 19, the determining of the weighting includes at least retrieving information from a source other than the on-demand service.

36. A system comprising:
the machine readable medium of claim 19;
a web server for implementing the method stored on the machine readable medium; and
a web database for storing information associated with a website that is associated with the tenant.

37. A system for providing a web page for posting ideas integrated with an on-demand service, the system comprising:
a host system having
a processor system,
volatile memory, and
non-volatile memory;
the non-volatile memory including at least one machine readable medium carrying one or more sequences of instructions for which when implemented causes the processor system to implement a method comprising:
receiving, at a host system, at least one vote for at least one of a plurality of ideas that were displayed, by a client machine, to a user on the webpage for posting ideas;
determining by the host system, a weighting for the at least one vote received from the client machine, based at least in part upon information about the user retrieved from the on demand service;
determining a Total Qualitative Management Criterion (TQMC) for the idea by applying, the weighting from the on-demand service to the at least one vote; and
sending, to the client machine, a display of the webpage having at least one idea ranked based on the TQMC.

38. The system of claim 37, the determination of a Total Qualitative Management Criteria further includes:
applying an increasing function of time to newer votes received from the client machine, to enable relative weightings of older votes to diminish over time without requiring computing a decaying time function to determine weightings for each vote.

39. The system of claim 37, the method further comprising providing analytical tools for analyzing a relative desirability of items associated with the ideas.

40. The system of claim 37, the method further comprising:
receiving a new idea from a user of the webpage having the ideas; and
posting the new idea on the webpage.

41. The system of claim 37, the method further comprising:
receiving a request from a system of a sponsor of the webpage to remove at least one idea of the plurality of ideas; and
in response, removing the at least one idea.

42. The system of claim 37, the method further comprising:
receiving a request to replace multiple occurrences of a word on the webpage with another word or phrase; and
in response, replacing the multiple occurrences of the word.

43. The system of claim 37, the host system being a host system of a provider of the webpage, the method further comprising:
receiving a request for locating the webpage at a particular domain name; and
in response, locating the webpage at a pre-established URL having that domain name.

44. The system of claim 37, the host system being a host system of a provider of the webpage, the method further comprising:
sending to a user of the webpage, tools for reporting to a system of a sponsor of the webpage abuse of the webpage.

45. The system of claim 37, the host system being a host system of a provider of the webpage, the method further comprising:
sending tools from a provider of the webpage to a system of a sponsor of the webpage for moderating content on the webpage.

46. The system of claim 37, the webpage being part of a first website provided by the host system, which is a host system of a first website providing entity, the method further comprising:
receiving a request from a user to access a part of the webpage that requires logging in;
determining that the user is not logged in; and
sending to the user a login request that is associated with a second website.

47. The system of claim 37, the webpage being part of a first website provided by the host system, which is a host system of a first website providing entity, the method further comprising:
receiving, at the host system of the first website providing entity, information about a second website, which is associated with a host system of a sponsor of the first website; and
configuring a process running on the first host system that is associated with the first website to call a login process that is also called by a process running on the host system of the second website.

48. The system of claim 37, the host system being a host system of a provider of the webpage, the method further comprising sending administrative tools from a provider of the webpage to a system of a sponsor of the webpage.

49. The system of claim 48, the administrative tools including one or more instructions for controlling access to the webpage.

50. The system of claim 48, the administrative tools including one or more instructions for controlling the appearance of the webpage.

51. The system of claim 37, the webpage being part of a first website provided by the host system, which is a host system of a first website providing entity, the first website being sponsored by a sponsor, the method further comprising:
receiving, at the host system of the first website providing entity, a request for locating the webpage at a particular domain name that already exists;
in response to the request for locating, locating the webpage at a pre-established URL having that domain name;
receiving a new idea from a user of the webpage;
posting the new idea on the webpage;
in response to one or more requests received from a system of the sponsor, analyzing a plurality of sections for information indicating a relative desirability of features of products associated with the plurality ideas;
receiving at the host system of the first website providing entity a request, by tools for moderating content of the first website, from the sponsor's system to remove at least one idea of the plurality of the ideas;
in response to receiving the request by the tools for moderating, removing the at least one idea;

receiving at the host system of the provider of the first website from the sponsor's system, a request to replace multiple occurrences of a word on the webpage with another word or phrase;

in response to the request to replace, replacing the multiple occurrences of the word;

receiving, at the host system of the provider of the first website from the client machine, by tools for reporting abuse, a report of an abuse of the webpage;

receiving, at the host system of the provider of the first website, a request from the client machine, which is associated with a user, to access a part of the webpage that requires users to be logged in;

determining that the user is not logged in; and sending to a webserver system associated with the sponsor, a login request that is associated with a second website, the login request being for the user.

52. The system of claim 37, the webpage being part of a first website provided by the host system, which is a host system of a first website providing entity, the method further comprising:

sending, to a sponsor's system, tools to report abuse of the first website by the first website, the sponsor being a sponsor of the first webpage that is provided by the first webpage providing entity;

receiving at the host system of the first website providing entity from the sponsor's system, a request for a choice of a level of service;

sending from the host system, which is associated with a provider of the webpage, administrative tools from the host system of the first webpage providing entity to the system of the sponsor of the webpage;

the administrative tools including at least one or more links for invoking one or more tasks for controlling access to the webpage, if consistent with the choice of the level of service;

one or more links for invoking one or more tasks for controlling an appearance of the webpage, if consistent with the choice of the level of service;

one or more links for invoking one or more tasks for moderating user interactions, if consistent with the choice of the level of service;

one or more links for invoking one or more tasks for translating text on the webpage from one language to another, if consistent with the choice of the level of service;

one or more links for invoking one or more tasks for causing the first website to appear as part of the second website, if consistent with the choice of the level of service;

one or more links for invoking one or more tasks that cause the first website to invoke a login that is invoked by the second website, if consistent with the choice of the level of service;

one or more links for invoking one or more tasks for analyzing postings on the webpage to determine modifications of one or more products, if consistent with the choice of the level of service; and one or more links for invoking one or more tasks for downloading data extracted from the postings on the webpage, if consistent with the choice of the level of service.

53. The method of claim 1, wherein the weighting for the at least one vote is based on the time of the vote, style of voting, or site management selected weightings retrieved from the on-demand service based on an identifying criteria about the user casting the vote prior to being tallied.

54. The machine readable medium of claim 19, wherein the weighting for the at least one vote is based on the time of the vote, style of voting, or site management selected weightings retrieved from the on-demand service based on an identifying criteria about the user casting the vote prior to being tallied.

55. The system of claim 37, wherein the weighting for the at least one vote is based on the time of the vote, style of voting, or site management selected weightings retrieved from the on-demand service based on an identifying criteria about the user casting the vote prior to being tallied.

56. The method of claim 1, the webpage being part of a first website provided by a first website providing entity, which is a tenant of a multitenant service, the method further comprising:

receiving a request from a user to access a part of the webpage that requires logging in;

determining that the user is not logged in; and sending to the user a login request that is associated with a second website, that is different from the first website, the second website being associated with the multitenant service.

57. The machine readable medium of claim 19, the webpage being part of a first website provided by a first website providing entity, which is a tenant of a multitenant service, the method further comprising:

receiving a request from a user to access a part of the webpage that requires logging in;

determining that the user is not logged in; and sending to the user a login request that is associated with a second website, that is different from the first website, the second website being associated with the multitenant service.

58. The system of claim 37, the webpage being part of a first website provided by a first website providing entity, which is a tenant of a multitenant service, the method further comprising:

receiving a request from a user to access a part of the webpage that requires logging in;

determining that the user is not logged in; and sending to the user a login request that is associated with a second website, that is different from the first website, the second website being associated with the multitenant service.

* * * * *

UNITED STATES PATENT AND TRADEMARK OFFICE
CERTIFICATE OF CORRECTION

| | |
|---|---|
| PATENT NO. | : 7,840,413 B2 |
| APPLICATION NO. | : 11/801572 |
| DATED | : November 23, 2010 |
| INVENTOR(S) | : Norimasa Yoshida et al. |

It is certified that error appears in the above-identified patent and that said Letters Patent is hereby corrected as shown below:

In column 41, line 7, replace "with the plurality ideas;" with --with the plurality of ideas--

Signed and Sealed this
Thirty-first Day of July, 2012

David J. Kappos
*Director of the United States Patent and Trademark Office*